United States Patent [19]

Hotta et al.

[11] Patent Number: 5,330,385
[45] Date of Patent: Jul. 19, 1994

[54] AIR CONDITIONING SYSTEM SUITABLE FOR USE IN AN ELECTRIC VEHICLE

[75] Inventors: Yoshihiko Hotta; Akihiro Tajiri, both of Wako, Japan

[73] Assignee: Honda Giken Kogyo Kabushiki Kaisha, Tokyo, Japan

[21] Appl. No.: 983,828

[22] Filed: Dec. 1, 1992

[30] Foreign Application Priority Data

Dec. 4, 1991 [JP] Japan .................. 3-320726

[51] Int. Cl.$^5$ .............................................. B60H 1/32
[52] U.S. Cl. ................................ 454/75; 62/131;
165/42; 236/1 R; 454/156
[58] Field of Search ............ 62/126, 127, 129, 131,
62/244; 236/1 R, 51; 454/75, 156, 159

[56] References Cited

U.S. PATENT DOCUMENTS 4,274,265 6/1981 Okumura et al. ............... 62/244 X
4,881,456 11/1989 Yasuda et al. ...................... 454/75

FOREIGN PATENT DOCUMENTS 82627 7/1981 Japan ................................ 62/131
110518 5/1987 Japan ................................ 454/75
3-42325 2/1991 Japan .

*Primary Examiner*—Harold Joyce
*Attorney, Agent, or Firm*—Lyon & Lyon

[57] ABSTRACT

An air conditioning system suitable for use in an electric vehicle for air-conditioning the driver and passenger room of the vehicle. The system basically comprises environment sensors, a warning device and a control device. The environment sensors detect the state of the environment in the vehicle room. In the control device, an air-conditioning switch is activated so that the output of the environment sensor is read. When the environment sensors produce an output indicative of an improper state of environment in the vehicle room, such an open window, an open door or an unmanned state of the vehicle room, the warning device is operated for a predetermined time period. Further, the air conditioner is deactivated when the output of any one of the environment sensors continues to indicate an improper environment condition after the predetermined period has elapsed.

7 Claims, 33 Drawing Sheets

NORMAL AIR-CONDITIONER OVERALL CONTROL FLOWCHART

| TITLE | APPLICATION | MODE | | | | | | |
|---|---|---|---|---|---|---|---|---|
| | | COOLING | VENTILATION | HEATING | FIRST DEHUMIDIFICATION | SECOND DEHUMIDIFICATION | FIRST THAWING | SECOND THAWING |
| INTERIOR HEAT EXCHANGER 14 | CONTROL OF TEMPERATURE OF AIR DELIVERED INTO ROOM | COOL | | HOT | HOT | HOT | HOT | COOL |
| INTERIOR HEAT EXCHANGER 12 | SUPPORT/DEHUMIDIFICATION OF INTERIOR HEAT EXCHANGER 14 | COOL | | HOT | COOL | COOL | HOT | HOT |
| EXTERIOR HEAT EXCHANGER 16 | EXCHANGER USED IN COMMUNICATION WITH OUTSIDE AIR/RECOVERY OF EXHAUST HEAT | HOT | | COOL | | COOL | HOT | HOT |
| INTERIOR FAN 32 | BLOWER FOR INTERIOR HEAT EXCHANGER | ON | ON | ON | ON | ON | ON | ON |
| INTERIOR FAN 34 | BLOWER FOR EXTERIOR HEAT EXCHANGER | ON | OFF(ON) | ON | ON | ON | ON | ON |
| COMPRESSOR 30 | OPERATE ON HOT AND COLD CYCLES | ON | OFF | ON | ON | ON | ON | ON |
| FOUR-WAY TYPE VALVE 22 | CHANGEOVER OF HOT AND COLD CYCLES | COOLING | | HEATING | HEATING | HEATING | HEATING | COOLING |
| BYPASS VALVE 18 | CIRCUIT CHANGEOVER WITH RESPECT TO EXPANSION VALVE 20 | OFF | | OFF | ON | ON | OFF | ON |
| BYPASS VALVE 26 | CIRCUIT CHANGEOVER WITH RESPECT TO EXPANSION VALVE 28 | ON | | ON | OFF | OFF | OFF | OFF |
| BYPASS VALVE 24 | CIRCUIT CHANGEOVER WITH RESPECT TO INTERIOR HEAT EXCHANGER 16 | ON | | ON | OFF | ON | ON | ON |
| EXPANSION VALVE 20 | INDEPENDENTLY USE INTERIOR HEAT EXCHANGERS 12,14 | OFF | | OFF | ON | ON | OFF | OFF |
| EXPANSION VALVE 28 | INDEPENDENTLY USE INTERIOR HEAT EXCHANGERS 12,16 | ON | | ON | OFF | OFF | OFF | OFF |
| OUTSIDE AIR INTRODUCING DAMPERS 36 | USE AIR FLOWING DURING RUNNING/FOR VENTILATION | SHUT | OPEN | SHUT | SHUT | SHUT | SHUT | SHUT |
| COMMUNICATION DAMPER 38 | FOR CIRCULATION OF INSIDE AIR | OPEN | SHUT | OPEN | OPEN | OPEN | OPEN | OPEN |
| THAWING MODE DAMPER 40 | FOR CIRCULATION IN INSIDE OF INDOOR UNIT (SECOND THAWING MODE) | SHUT | SHUT | SHUT | SHUT | SHUT | SHUT | OPEN |
| INSIDE AIR DISCHARGE DAMPER 42 | FOR VENTILATION OF ROOM | SHUT | OPEN | SHUT | SHUT | SHUT | SHUT | SHUT |
| REAR INTAKE DAMPER 44 | FOR COOLING OF HEAT/INTRODUCTION OF OUTSIDE AIR INTO HEAT EXCHANGER | OPEN | S(O) | OPEN | OPEN | S(O) | SHUT | SHUT |
| VENTILATION DAMPER 46 | FOR EXHAUST | OPEN | OPEN | OPEN | OPEN | S(O) | SHUT | SHUT |

FIG. 29.

AIR CONDITIONING SYSTEM SUITABLE FOR USE IN AN ELECTRIC VEHICLE

BACKGROUND OF THE INVENTION

1. Field of the Invention

The present invention relates to an air conditioning system suitable for use in an electric vehicle, and more specifically to such an air conditioning system suitable, wherein when either a door or a window is in an opened state or the vehicle room is in an unmanned state, the power consumption can be controlled by deactivating the air conditioner.

2. Description of the Related Art

The concept of mounting an air conditioner in a vehicle and controlling the temperature, humidity, airflow, etc. inside of the vehicle so as to ensure comfortable driving, has heretofore been carried out.

Similarly, an electric vehicle is also provided with the air conditioner. In this case, a battery for energizing a motor used as a drive source for running the vehicle is used in common for a drive source used for the air conditioner. However, the power to be stored in the battery attached to the electric vehicle is restricted.

Thus, in the air conditioner mounted to the electric vehicle, a method has been examined which automatically controls the output of a compressor according to the environment in the vehicle room and controls the consumption of power stored in the battery so as to make the power consumption as efficient as possible.

In the conventional air conditioning system for the electric vehicle, however, the air conditioner can be activated even when either the door or the window is in an opened state. Therefore, there was a risk of the battery power being wasted through the driver's carelessness.

When the electric vehicle stops is stopped, the motor used as the driver source is de-energized. Therefore, the vehicle room becomes silent and the driver is hence apt to leave his/her vehicle with a switch for the air-conditioner left on, thereby causing a problem that the unmanned vehicle room is air-conditioned and the valuable battery power is wasted.

SUMMARY OF THE INVENTION

It is a general object of the present invention to provide an air conditioning system suitable for use in an electric vehicle, wherein when either a door or a window is opened during a period in which an air conditioner is being activated under an AUTO mode, an alarm is sounded so as to inform the driver of information about the opened state of either the door or window and when the vehicle room is in an unmanned state, and the air conditioner is deactivated, thereby making it possible to control the consumption of power required to air-condition the room and to efficiently use the battery power.

It is a principal object of the present invention to provide an air conditioning system for use in an electric vehicle having an air conditioner for air-conditioning the room of the vehicle. The system comprises an environment sensor for detecting the state of an environment in the vehicle room, warning means, and controlling means for operating an air-conditioning switch so as to read the output of the environment sensor, activating the warning means for a predetermined time interval only when the environment sensor produces an output indicative of an improper state of environment in the vehicle room, and deactivating the air conditioner when the output of the environment sensor remains unchanged after a predetermined time interval has elapsed.

It is another object of the present invention to provide such an air conditioning system wherein the environment sensor includes at least a door opening/closing sensor for detecting an open state of a vehicle door and a window opening/closing sensor for detecting an open state of a vehicle window.

It is a further object of the present invention to provide an air conditioning system for use in an electric vehicle for air-conditioning the room of the vehicle by using the power of a battery used as a vehicle drive source. The system comprises a seated-state sensor associated with at least one seat of the vehicle, and controlling means for activating an air-conditioning switch so as to read the output of the seated-state sensor and for deactivating the air conditioning system when the output of the seated-state sensor represents that the vehicle room is in an unmanned state in excess of a predetermined time interval.

It is a still further object of the present invention to provide an air conditioning system suitable for use in an electric vehicle for air-conditioning the room of the vehicle. The system comprises an environment sensor for detecting the state of the environment in the vehicle room, warning means, and controlling means for activating an air-conditioning switch so as to read the output of the environment sensor and for displaying information detected by the environment sensor on displaying means and activating the warning means when the environment sensor produces an output indicative of an improper state of environment in the vehicle room for a period of time in excess of a predetermined time interval.

It is a still further object of the present invention to provide such an air conditioning system wherein the environment sensor includes at least a door opening/closing sensor for detecting an open state of a vehicle door and a window opening/closing sensor for detecting an open state of a vehicle window.

It is a still further object of the present invention to provide an air conditioning system wherein the environment sensor includes a seated-state sensor associated with at least one seat of the vehicle, and controlling means for activating an air-conditioning switch so as to read the output of the seated-state sensor and for deactivating the air conditioning system when the output of the seated-state sensor represents that the vehicle room is in an unmanned state in excess of a predetermined time interval.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 29 is a table for describing the operations of the embodiment shown in FIG. 1, which are effected under the respective air-conditioning modes;

DETAILED DESCRIPTION OF THE PREFERRED EMBODIMENTS

In the present embodiment, an electric automobile is used as the vehicle for describing the invention. The electric vehicle has a battery mounted therein, which can be charged to a necessary level from an unillustrated external power supply.

Figure 1:
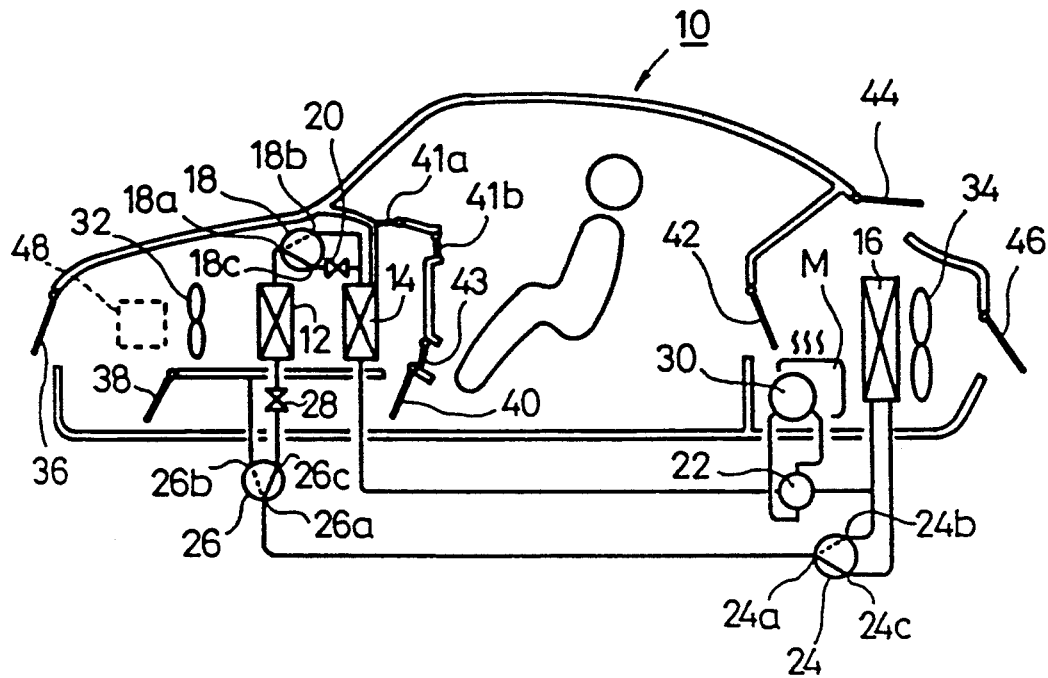
FIG. 1 is a schematic view showing an electric vehicle for effecting one embodiment according to the present invention.

Referring to FIG. 1, the electric vehicle 10 has an interior heat exchanger 12, an interior heat exchanger 14 connected in series with the interior heat exchanger 12, and an exterior heat exchanger 16. A refrigerant gas circulatory system of a heat pump type is comprised of pipelines or lines which connect the interior heat exchangers 12, 14 and the exterior heat exchanger 16 to one another. A bypass valve 18 is provided between the interior heat exchanger 12 and the interior heat exchanger 14. A line, which is coupled to the interior heat exchanger 14, is connected to one of points downstream of the bypass valve 18. An expansion valve 20 is interposed in a line coupled to the other point downstream of the bypass valve 18.

Further, a four-way type valve 22 is provided at a point downstream of the interior heat exchanger 14. The downstream side of the four-way type valve 22 communicates with the exterior heat exchanger 16. A pair of lines, which are provided side by side, are disposed on the downstream side of the exterior heat exchanger 16. A bypass valve 24 is interposed in both of the above lines. The downstream side of the bypass valve 24 is connected to a bypass valve 26. Parallel lines are respectively coupled to points downstream of the bypass valve 26. An expansion valve 28 is interposed in one of the parallel lines. The interior heat exchanger 12 is connected to a point downstream of the line including the expansion valve 28.

Two lines, which are coupled to the four-way type valve 22 are respectively connected to a compressor 30. The four-way type valve 22 is switched over so as to supply refrigerant such as freon or the like to the exterior heat exchanger 16 and the interior heat exchanger 14 from the compressor 30. Further, fans 32, 34, which are operated by unillustrated rotative drive sources, are mounted adjacent to the interior heat exchanger 12 and the exterior heat exchanger 16, respectively. There are also provided dampers 36, 38, 40, 41a, 41b, 42, 43, 44 and 46 for enabling the room or interior air to communicate with the outside air or effectively recirculating the interior air. Incidentally, reference numeral 48 in FIG. 1 of the drawing indicates a battery that serves as the vehicle drive power source. Further, reference symbol M designates a prime mover, i.e., an electric motor in the present embodiment.

The mechanical construction of the electric vehicle 10 according to the present embodiment is as described above. The electrical construction of the electric vehicle 10 will now be described below with reference to FIGS. 2 through 4.

Figure 2:
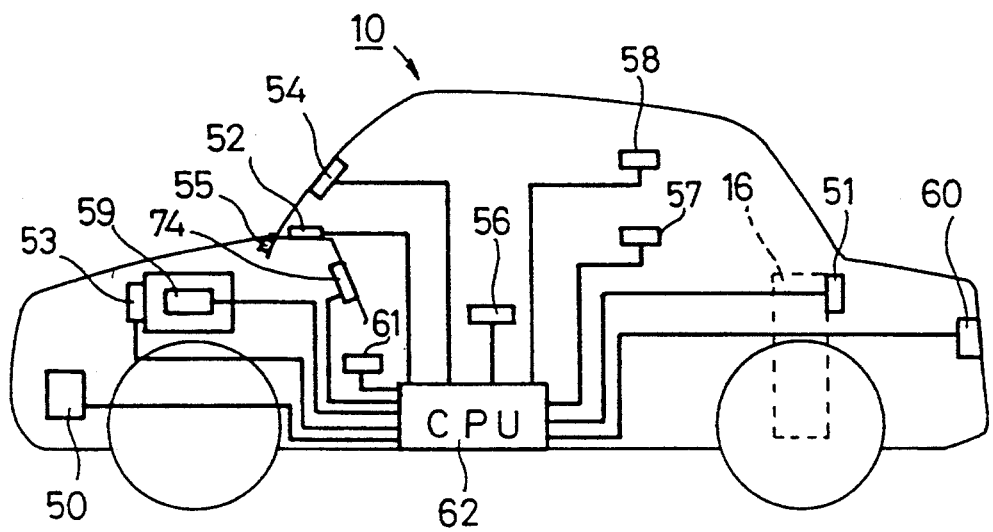
FIG. 2 is a schematic view illustrating a control means including various sensors employed in the embodiment shown in FIG. 1.

As shown in FIG. 2, the electric vehicle 10 is provided with an inverter 50 for driving the compressor 30, an exterior icing or freezing sensor 51 attached to the exterior heat exchanger 16, a solar-radiation or insolation sensor 52, a charge/discharge current sensor 53, a moisture or humidity sensor 54, a glass icing or freezing sensor 55, a room temperature sensor 56, a door opening/closing sensor 57, a window opening/closing sensor 58, a depth-of-discharge sensor 59, an outside air or atmospheric temperature sensor 60 and a seat pressure sensitive sensor 61. The outputs of these sensors are supplied to a CPU 62.

Figure 3:
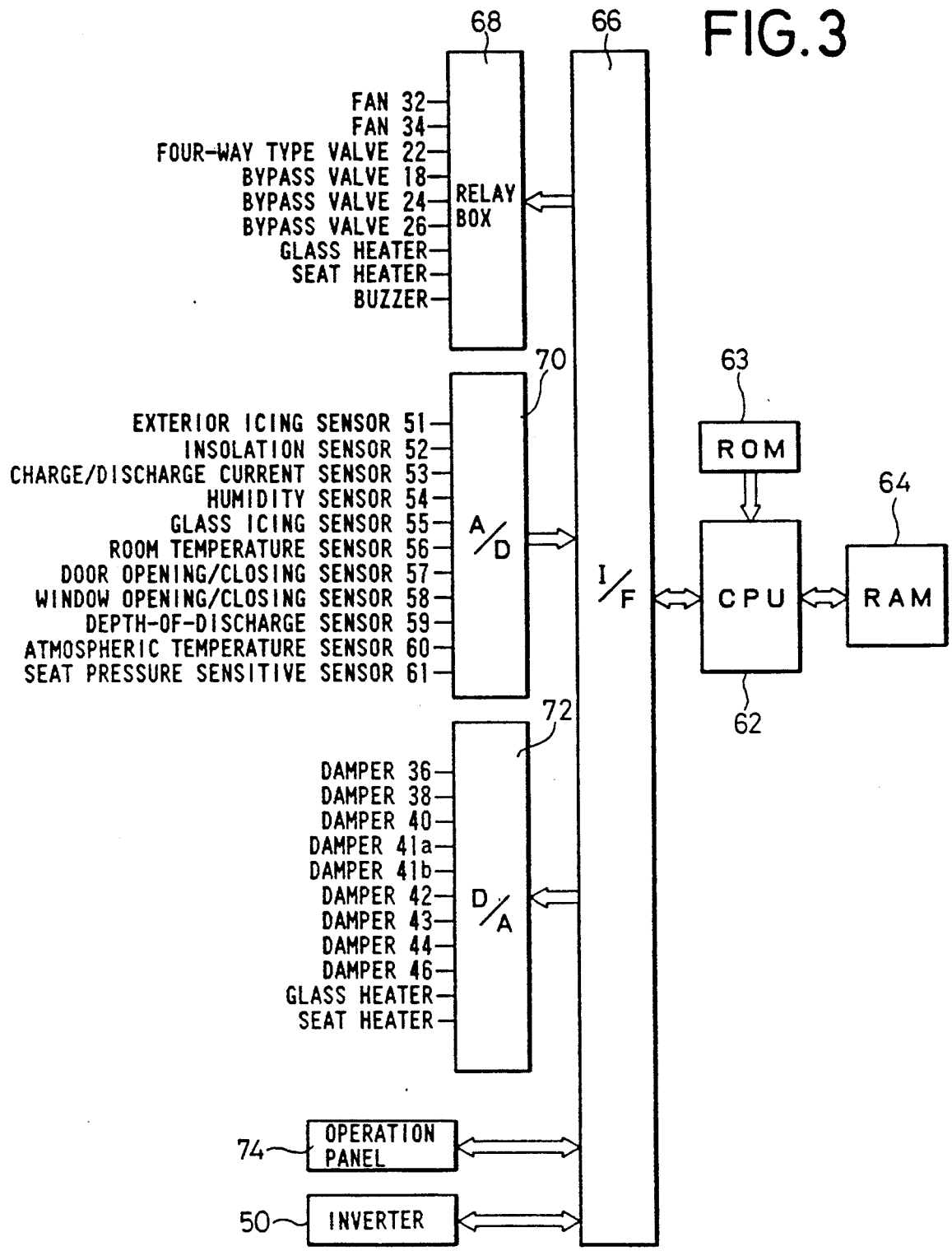
FIG. 3 is a detailed view illustrating a control system employed in the embodiment shown in FIG. 1.

FIG. 3 is a view diagrammatically showing the structure of a control system including the CPU 62.

The CPU 62 is provided with a ROM 63 for storing processing procedures of the CPU 62 therein as data, a RAM 64 for temporarily storing therein signals outputted from the respective sensors referred to above and an interface 66. The interface 66 is supplied with signals outputted from the groups of various switches which are respectively attached to a relay box 68 for turning ON and OFF the fans 32, 34, the four-way type valve 22, the bypass valves 18, 24, 26, etc., i.e., effecting the switching action of the same, an A/D converter 70 for converting the output signals, serving as analog signals, of the respective sensors into digital signals so as to supply the same to the interface 66, a D/A converter 72 for converting digital signals into analog signals in order to activate fans, dampers and glass heaters or the like, and a control or operation panel 74.

Figure 4:
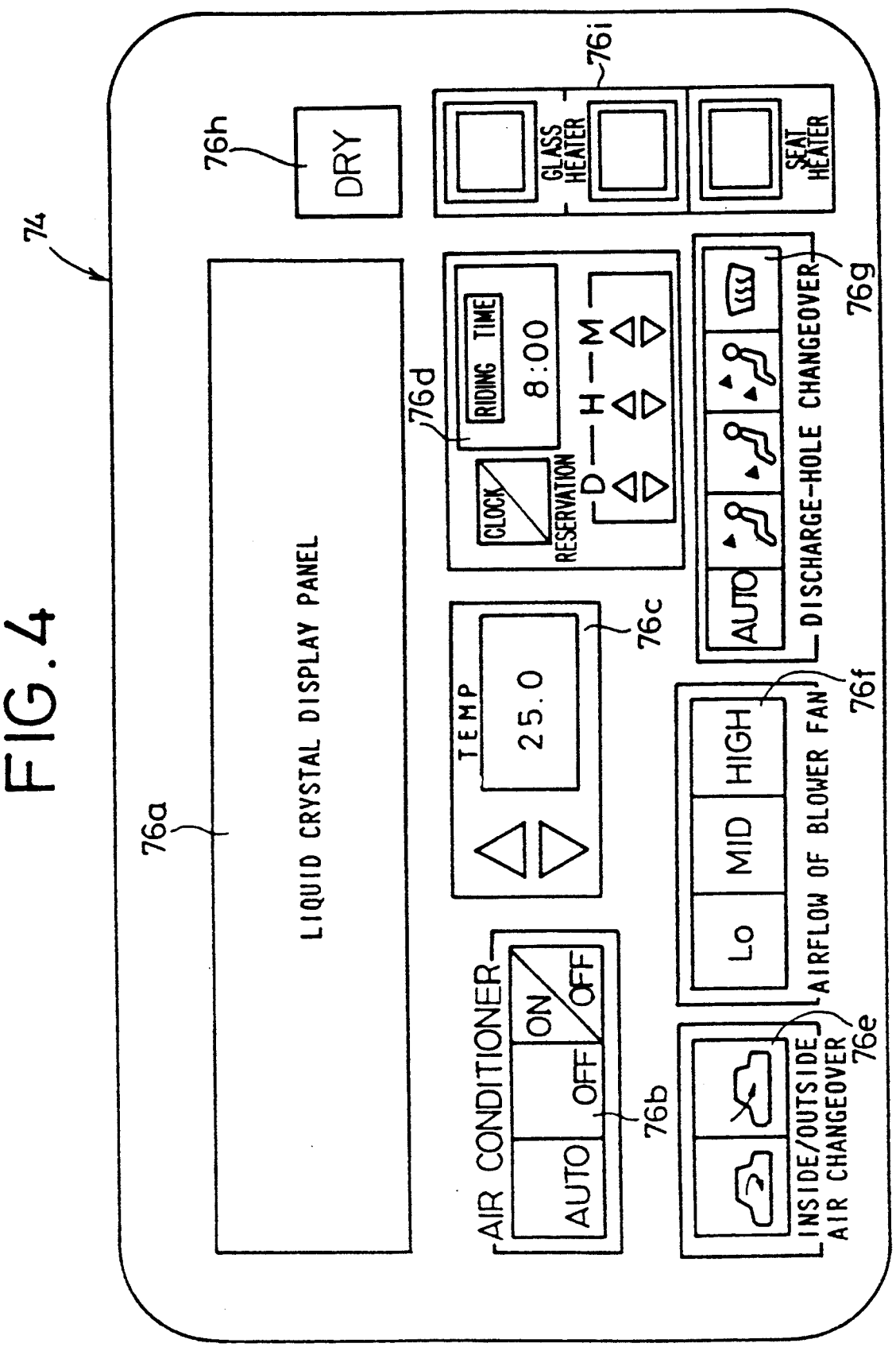
FIG. 4 is a view of a control panel employed in the embodiment depicted in FIG. 1.

FIG. 4 shows the operation panel 74. The operation panel 74 is divided into nine major blocks 76a–76i. A liquid crystal display panel 76a is provided at the uppermost position of the operation panel 74. The liquid crystal display panel 76a can digitally or analogically display thereon temperature, moisture or humidity, etc. detected by a sensor, for example.

Reference numeral 76b indicates control switches for enabling the operation or non-operation of an air conditioner. An AUTO ON switch of the control switches is used to operate the air conditioner so as to automatically adjust the temperature or humidity of the room. An OFF switch is used to bring the air conditioner to a non-operated state. A pre-A/C switch is used as an ON/OFF switch for adjusting the temperature or humidity or the like in the room in advance by using an external power supply or the like before a driver or a passenger enters the vehicle, i.e., effecting pre-air conditioning (hereinafter called "pre-air con").

Reference numeral 76c indicates a switch used to set the desired interior temperature. A digitally-set temperature or a detected temperature is shown on the right side of the switch 76c. A triangular up switch for increasing the set temperature is provided on the left side of the switch 76c and a triangular down switch for reducing the set temperature is provided below the up switch. Reference numeral 76d indicates a section for digitally displaying the riding hour or time. The section comprises an indicator for indicating a clock or the reserved hour or time or a switch for setting the same, and switches for changing each of the date (D), the hour (H) and the minute (M) up or down and setting the same. The expected start of the riding time can be changed or fixed by setting the date (D), the hour (H) and the minute (M).

Inside/outside air changeover switches designated at reference numeral 76e are provided on the lower and left side of the control panel 74. The right switch is used to introduce the outside air into the room, whereas the left switch is used to recirculate the inside air only within the room. Each of the right and left switches is of an ON/OFF type. Reference numeral 76f indicates switches used to control the rate of airflow of the blower fan. The left switch is used to circulate or take in air at a relatively slow airflow. The centrally-provided switch is used to circulate or take in the air at a medium airflow. Further, the right switch is used to circulate or take in the air at a strong airflow.

Reference numeral 76g indicates switches used to perform the changeover of air discharge or blowoff holes. More specifically, as has already been described in connection with FIG. 1, these switches are used to control the opening and closing of the dampers according to the various conditions required for air circulation. The left AUTO switch is used to allow the system to automatically select a desired discharge hole. The second switch as counted from the left side is used to feed air toward the chest of a driver. The third switch as counted from the left side is used to open and close dampers so as to feed the air toward the legs of the driver. The fourth switch as counted from the left side is used to feed the air toward the chest and legs of the driver. The right switch is used to feed the air along the inside surface of the front window glass.

Reference numeral 76h indicates a DRY switch. Reference numeral 76i indicates a section of ON/OFF switches for activating heaters used to heat front and rear windows and a seat heater used to heat a seat.

The operation of an air conditioning system suitable for use in the electric vehicle constructed as described above will hereinafter be described in detail in accordance with the accompanying flowcharts, specifically laying stress on the operation of the CPU 62.

Figure 5:
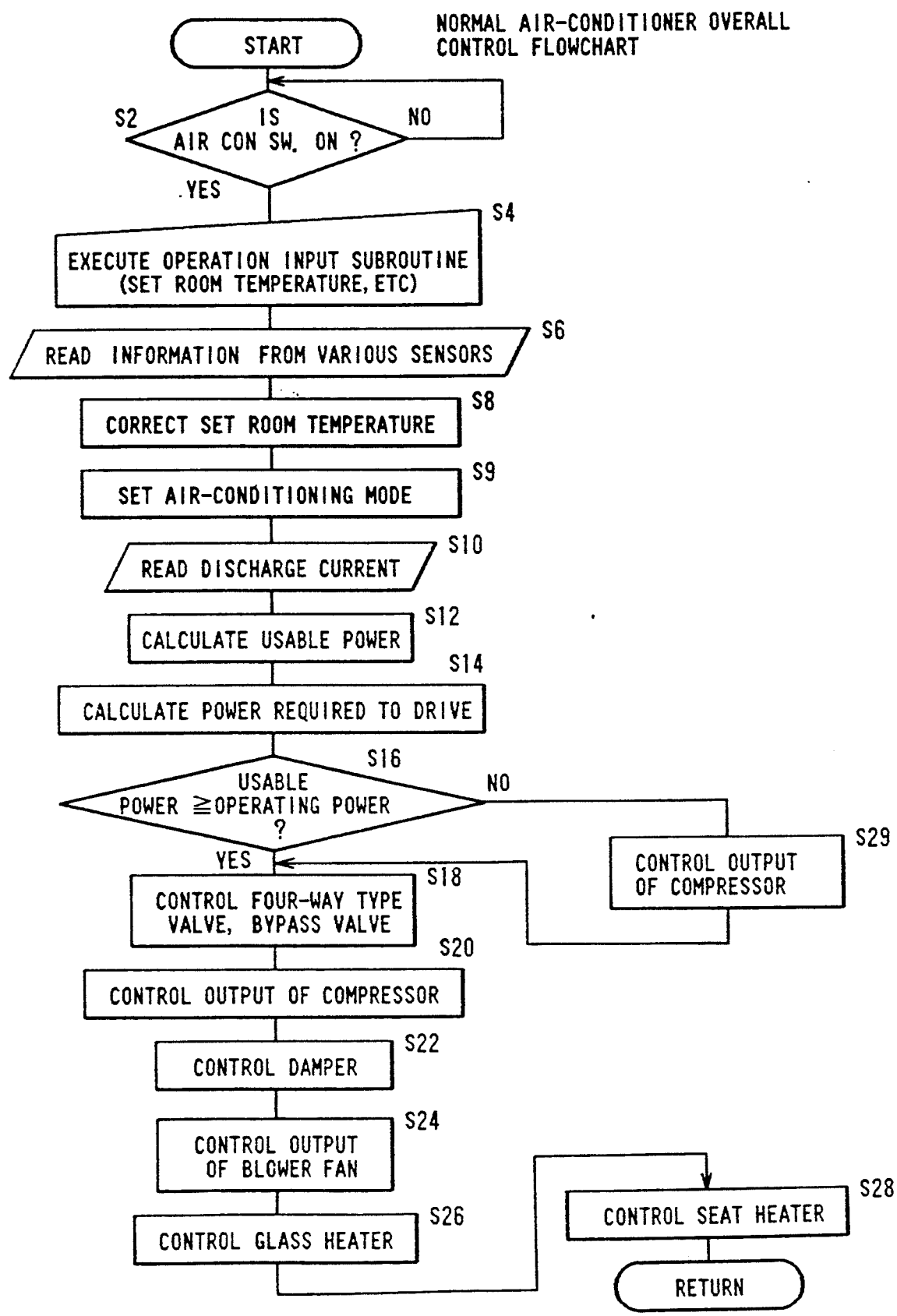
FIG. 5 is a flowchart for describing the overall operation of the embodiment shown in FIG. 1, which is executed under a normal air-conditioning mode.

FIG. 5 shows a control flowchart used when an air conditioner employed in a running electric vehicle is operated, in contrast to an unoccupied vehicle under pre-air con that will be described later.

Figure 12:
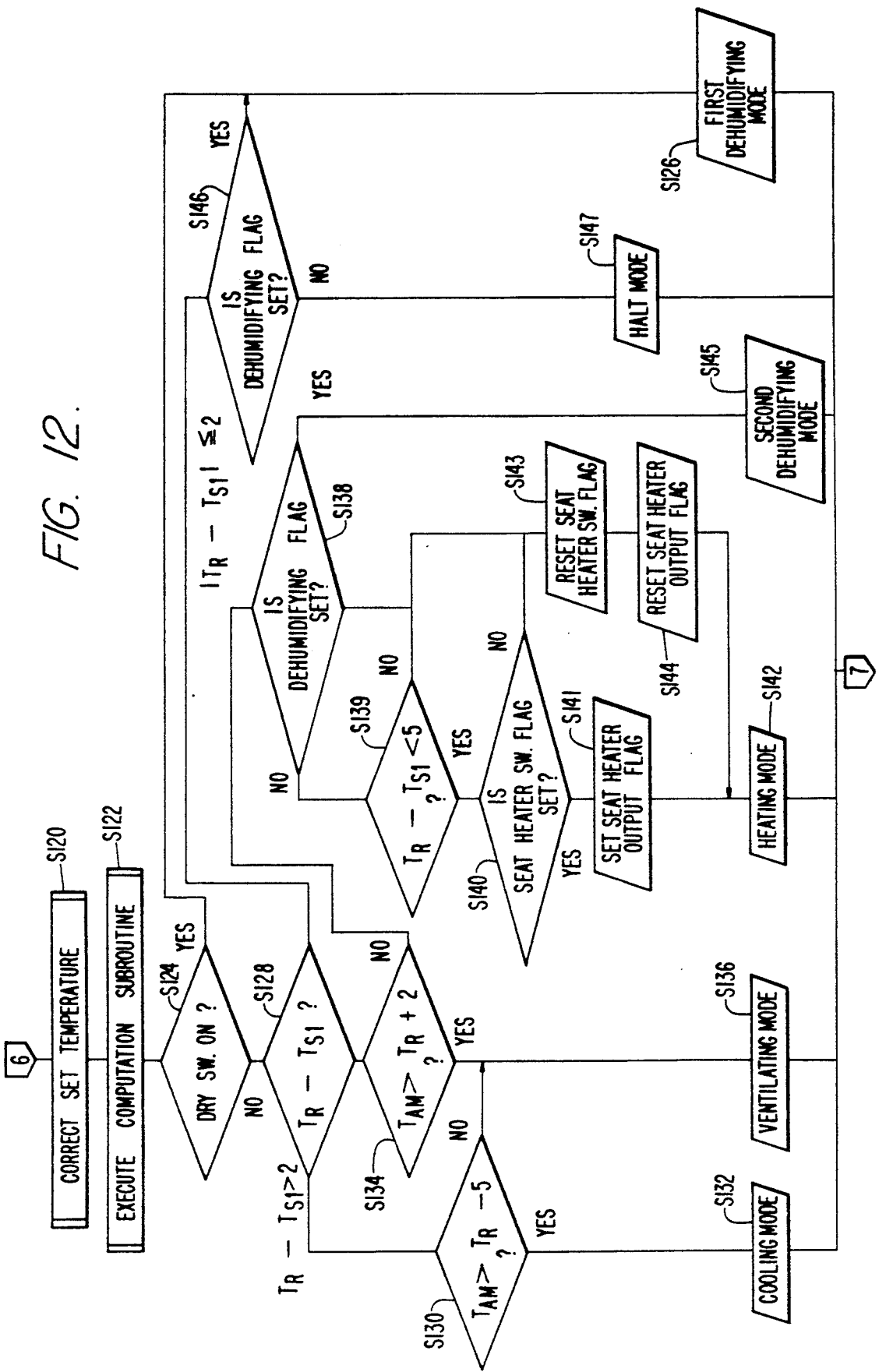
FIG. 12 is a flowchart for describing a still further control operation of the embodiment depicted in FIG. 1, which is executed under the normal air-conditioning mode.

Whether the AUTO switch (see FIG. 4) of the air-conditioner control switches 76b has been operated is determined (Step S2). When the room temperature target is set by the temperature setting switch 76c (Step S4), the CPU 62 reads information about the room temperature, etc. from the various sensors (Step S6). The CPU 62 corrects the set room temperature based on the read information (Step S8). A cooling or heating air-conditioning mode is set based on the information thus read (Step S9). The subroutine for Steps S8 and S9 is shown in FIG. 12 and will be described in detail below.

Next, the CPU 62 causes the charge/discharge current sensor 53 to read the discharge or discharging current of the battery 48 (Step S10). Thereafter, the CPU 62 computes the remaining capacity of the battery 48 from the read discharging current and calculates the maximum value of the power which can be used according to the computed residual capacity of the battery 48 (Step S12). Further, the CPU 62 calculates the total power required to drive the vehicle, which comprises power for energizing a motor used to run the vehicle, power for activating electrical equipment other than the motor, such as a headlights, etc., and power for activating the air conditioner (Step S14). It is then determined whether or not the maximum value of the usable power of the battery 48, which has been determined in Step S12, is greater than the power required to drive the vehicle (Step S16). If tile answer is determined to be Yes (i.e., if usable power ≧ operating power), then the CPU 62 controls the four-way-type valve 22 and the bypass valves 18, 24, 26 or the like (Step S18).

At this time, a determination has already been made in Step S16 as to whether or not the remaining capacity of the battery 48 provides the power required to run the vehicle and is sufficient to use the air conditioner. If the answer is determined to be Yes, then the routine proceeds to Step S18. Thereafter, the CPU 62 performs air-conditioning control such as output control of the compressor 30 of the air conditioner (Step 820), opening and closing control of each of the dampers 36 through 46 (Step S22), output control of each of the blower fans 32, 34, control of the glass heaters (Step S26), control of the seat heater (Step S28), etc.

If the answer is determined to be No in Step S16, then the CPU 62 restricts the output of the compressor 30 of the air conditioner until the usable power is greater than or equal to the operating power (i.e., usable power ≧ operating power) (Step 829).

A method of controlling the air conditioner which operates during the normal running of the vehicle will next be described with reference to flowcharts shown in FIGS. 6 through 13 and FIG. 15.

The seat heater switch is first operated to an off condition and a seat heater output flag is then set. Further, respective flaws indicative of or corresponding to a cooling mode, a heating mode, a first dehumidifying mode, a second dehumidifying mode, a first thawing mode, a second thawing mode and a ventilating mode all of which are used to effect the air conditioning of the vehicle room, are set to initial conditions (Step S30). It is then determined whether or not an unillustrated ignition (IGN) switch of the electric vehicle is in operation (Step S32). If the answer is determined to be No, it is then determined whether or not the pre-A/C switch of the control switches 76b has been selected by the driver (Step S34). If the answer is determined to be Yes, then pre-A/C control is effected, as will described later. If, on the other hand, it is determined that the pre-A/C switch has not been selected, then the routine returns to Step S32.

Figure 8:
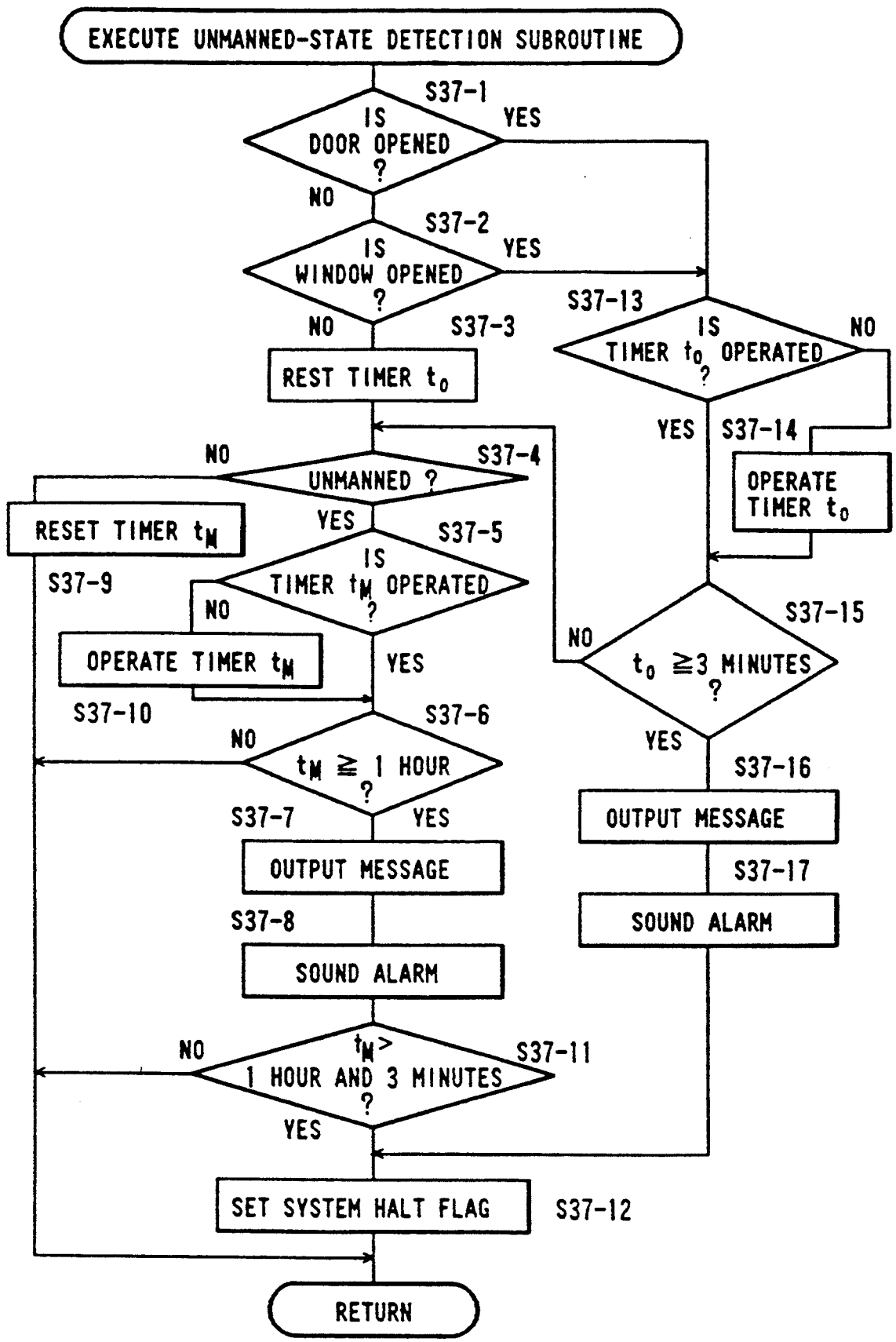
FIG. 8 is a flowchart for describing the operation for control of an unmanned-state detection subroutine shown in FIG. 6 which is executed under the normal air-conditioning mode.

If, on the other hand, it is determined that the IGN switch has been actuated by the driver, it is then judged whether or not the AUTO switch (see FIG. 4) of the control switches 76b is being selected (Step S36). If the answer is determined to be No, then the routine returns to Step S32. If the answer is determined to be Yes in Step S36, a process for an unmanned-state detection subroutine (Step S37) is executed, as illustrated in FIG. 8.

That is, the CPU 62 reads information from the door opening/closing sensor 57 and the window opening/closing sensor 58. It is thereafter determined based on the read information whether or not the door is in an opened state (Step S37-1) or the window is in an opened state (Step S37-2). If it is determined that the door and the window are both in a closed state, then a door/window opening time accumulating or counting timer $t_o$ is reset (Step S37-3) and the output of the seat pressure sensitive sensor 61 is read. It is thereafter determined based on the so-read output whether or not the vehicle room is in an unmanned state (Step S37-4).

If the answer is determined to be Yes in Step S37-4, it is then determined whether or not a man-free time accumulating timer $t_M$ is in operation (Step S37-5). If the answer is determined to be Yes in Step S37-5, it is then judged whether or not the elapse of time at the unmanned state is one hour (Step S37-6). Thus, the routine is returned until the elapsed time at the unmanned state reaches one hour. When the elapse of the time at the unmanned state is brought to one hour, a message indicative of "The room is in an unmanned state and please turn off the air conditioner", for example, is displayed on the liquid crystal display panel 76a (Step S37-7) and an alarm is given or sounded (Step S37-8).

If the answer is determined to be No in Step S37-4, then the man-free time accumulating timer $t_M$ is reset (Step S37-9) and the routine procedure is returned to the main routine. If the answer is determined to be No in Step S37-5, then the timer $t_M$ is operated (Steps S37-10) and a man-free time monitoring routine shown in Step S37-6 is executed.

After the alarm has been sounded in Step S37-8, it is determined whether or not the timer $t_M$ has counted or measured a time interval past one hour and three minutes (Step S37-11). The routine procedure is returned to the main routine until the accumulating time at the unmanned state is past or over one hour and three minutes. If one hour and three minutes have elapsed, then a flag for halting the operation of the air conditioning system comprised of the compressor 30, etc. is set (S37-

12) and the routine procedure is returned to the main routine.

If, on the other hand, it is determined in Step S37-1 that the door is open and/or if it is determined in Step S37-2 that the window is open, it is then determined whether or not the door/window opening time accumulating timer $t_o$ is in operation (Step S37-13). If the answer is determined to be No, then the timer $t_o$ is operated (Step S37-14). A routine for monitoring whether or not the accumulating time of the timer $t_o$ exceeds three minutes is executed (Step S37-15).

If it is determined that the accumulating time of the timer $t_o$ falls within three minutes, then Steps subsequent to an unmanned-state determining Step corresponding to Step S37-4 are executed. When the door and/or the window has continuously been opened over three minutes, a message indicative of "The door is now open and hence please close the door" or "The window is now open and hence please close the window" is displayed on the liquid crystal display panel 76a (Step S37-16). In addition, a buzzer is activated so as to sound an alarm indicative of the fact that the door and/or the window is in the opened state (Step S37-17). Thereafter, a flaw for halting the operation of the air conditioning system is set (S37-12).

In the unmanned-state detection subroutine as described above, the message is displayed and the alarm is sounded when the door and/or the window is opened while the air conditioning in the room is being effected under AUTO, thereby urging the driver to close the door and/or the window. It is thus possible to control the consumption of power required to drive the air conditioner.

When the vehicle room is brought to the unmanned state over one hour or longer since the disembarkation of a driver or the like from the vehicle in a state of a failure to turn off the air conditioner, the air conditioner is inactivated so as to control the consumption of power used to air-condition the unmanned room.

It is then determined whether or not an input has been given from an operation key on the control panel 74 (Step S38). If the answer is determined to be Yes, then the input is read in accordance with an operation input subroutine (Step S40).

Figure 9:
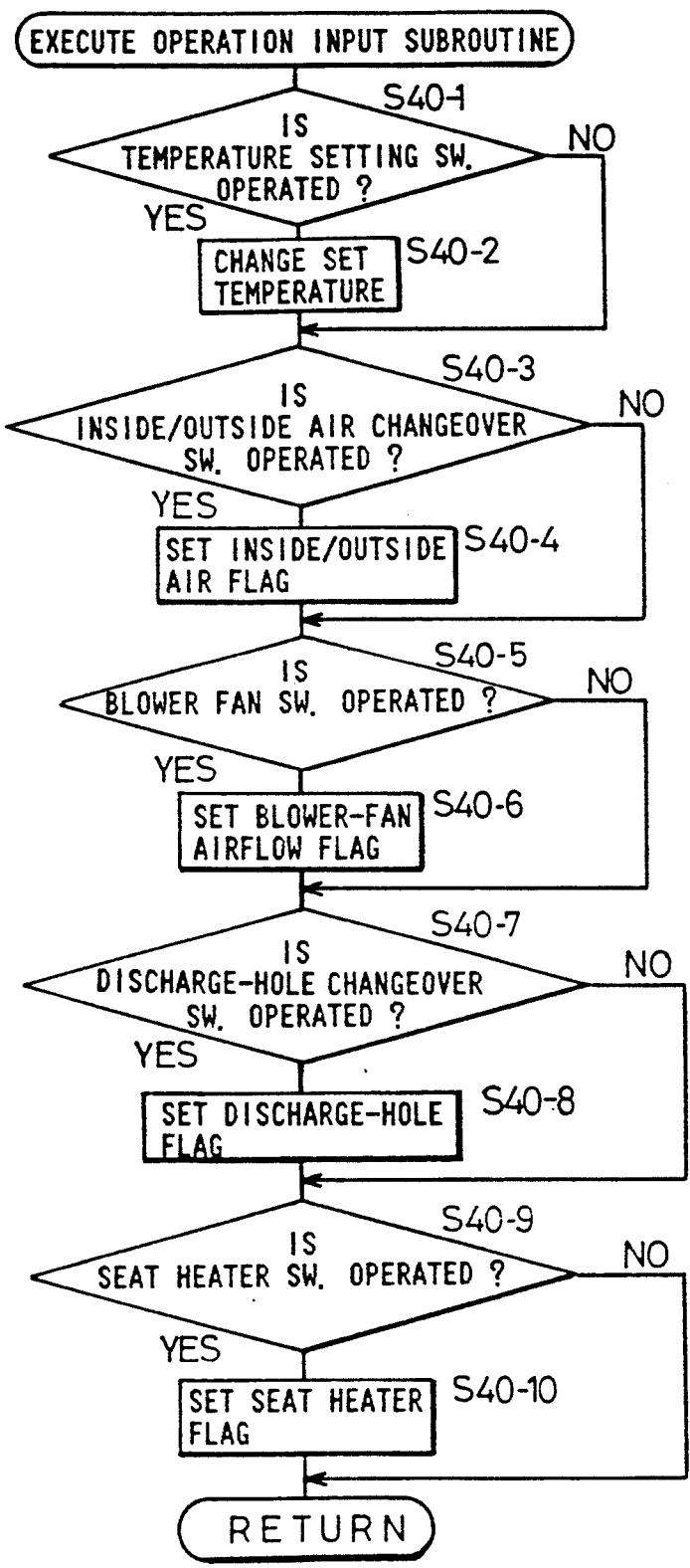
FIG. 9 is a flowchart for describing the operation for control of an operation input subroutine shown in FIG. 6 which is executed under the normal air-conditioning mode.

In the operation input subroutine, the control of the air conditioner is changed when the operation key of the operation panel 74 is operated as shown in FIG. 9. That is, it is determined whether or not the switch 76c is being actuated (Step S40-1). If the answer is determined to be Yes, then the set-temperature is changed (Step S40-2). It is then determined whether or not the inside/outside air changeover switches 76e are being actuated (Step S40-3). If the answer is determined to be Yes, then the dampers are operated and an inside/outside air flag for effecting the changeover of the inside and outside air is set (Step S40-4).

It is further determined whether or not the switches 76f are in operation (Step S40-5). If the answer is determined to be Yes, then a flag for effecting the changeover of the airflow of the blower fan is set (Step S40-6). It is thereafter determined whether or not the switches 76g are being operated (Step S40-7). If the answer is determined to be Yes, then the dampers disposed in the room are operated and a flag for performing the changeover of the discharge holes is set (Step S40-8).

Furthermore, it is determined whether or not the seat heater switch has been brought to an operated state (Step S40-9). If the answer is determined to be Yes, then the seat heater output flag is set. If it is determined that the seat heater switch has been reset, then the flaw is reset (Step S40-10).

Next, the CPU 62 reads the output produced from all of the sensors. That is, the exterior icing sensor 51 detects whether or not the exterior heat exchanger 16 has been frozen or iced (Step S42). Thereafter, the following detecting processes are successively effected. The insolation sensor 52 detects the amount of solar radiation (Step S44). The charge/discharge current sensor 53 detects the discharging current of the battery 48 (Step S46) and the humidity sensor 54 detects the humidity of the room (Step S48). Further, the glass icing sensor 55 detects whether or not either of the front window glass and the rear window glass is in an iced state (Step S50). Furthermore, the room temperature sensor 56 detects the temperature of the room (Step S52) and the atmospheric temperature sensor 60 detects the temperature of the outdoor air (Step S56).

Figure 7:
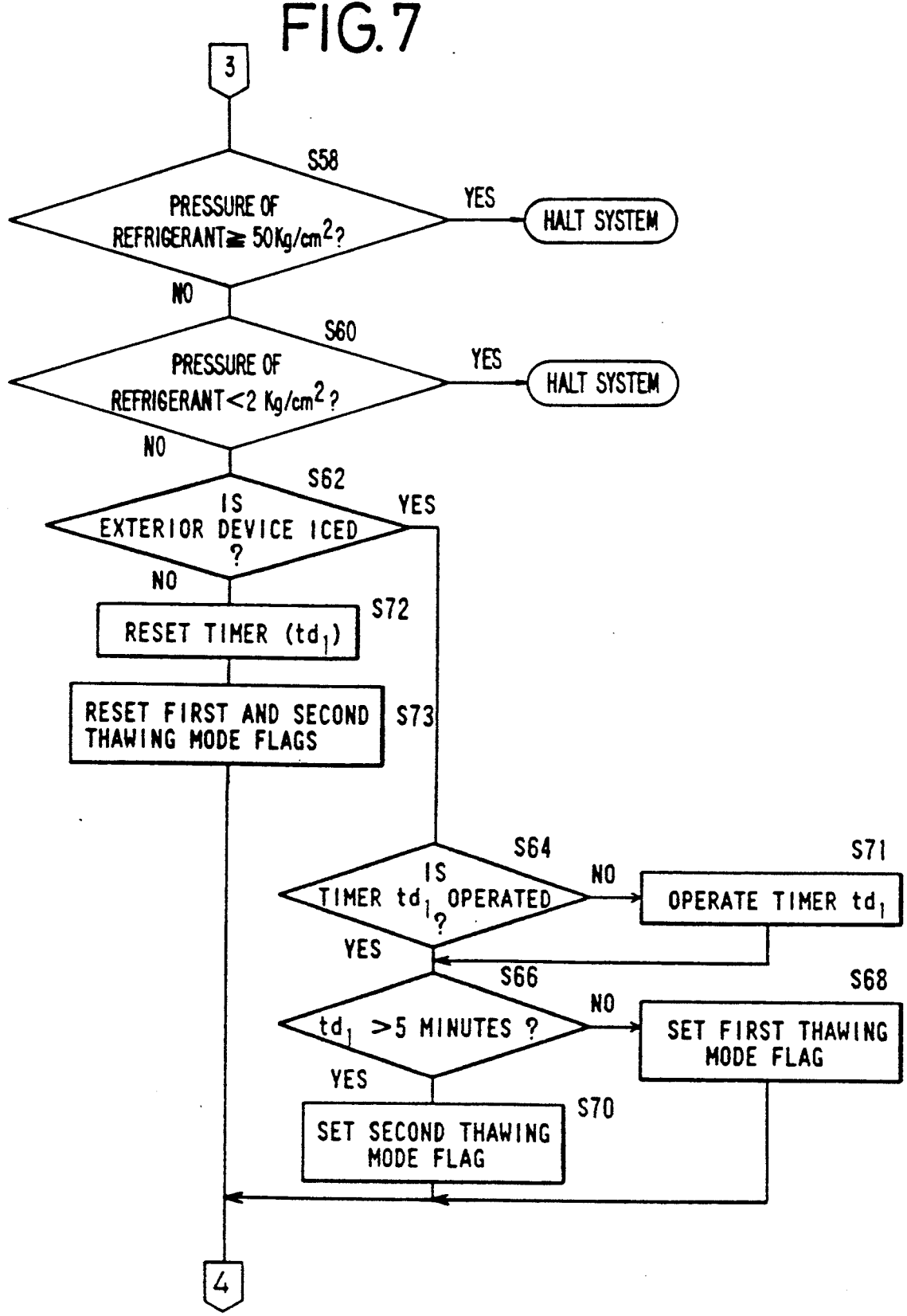
FIG. 7 is a flowchart for describing another control operation of the embodiment shown in FIG. 1, which is made under the normal air-conditioning mode.

It is next determined in the subroutine of FIG. 7 whether or not the pressure of the refrigerant has been brought to suitable pressure, for example, the pressure of the refrigerant falls between 2 kg/cm$^2$ and 50 kg/cm$^2$ (i.e., 2 kg/cm$^2 \leq$ pressure of refrigerant $\leq$ 50 kg/cm$^2$) (Steps S58 and S60). If the answer is determined to be No, it is then determined that the pressure of the refrigerant is improper. Thus, the operation for controlling the air conditioner is stopped.

If the answer is determined to be Yes in Steps S58 and S60, it is then determined whether or not the exterior heat exchanger 16 is in an iced state (Step S62). If the answer is determined to be Yes, it is then judged whether or not a timer $t_{d1}$ for the thawing is in operation (Step S64). If the answer is determined to be Yes, it is then determined whether or not the elapsed time of the timer $t_{d1}$ is five minutes or above (Step S66). If it is determined that the elapsed time of the timer $t_{d1}$ falls within five minutes, then the flag corresponding to the first thawing mode which lessens an influence on the control of the air conditioner, is set (Step S68). If it is determined that the elapsed time of the timer $t_{d1}$ is five minutes or above, i.e., when the thawing is not effected even if thawing control is performed for five minutes under the first thawing mode, the flag corresponding to the second thawing mode is set so as to change the first thawing mode to the second thawing mode capable of providing large thawing ability as compared with the first thawing mode (Steps S70).

If the answer is determined to be No in Step S64, then the timer $t_{d1}$ is operated (Step S71) and a timer monitoring routine in Step S66 is executed.

When the thawing is effected in this way and the exterior heat exchanger 16 is brought to a deiced state or when the state of icing is not detected from the beginning, the timer $t_{d1}$ is reset (Step S72) and the flags for the first and second thawing modes are reset (Step S73).

Figure 10:
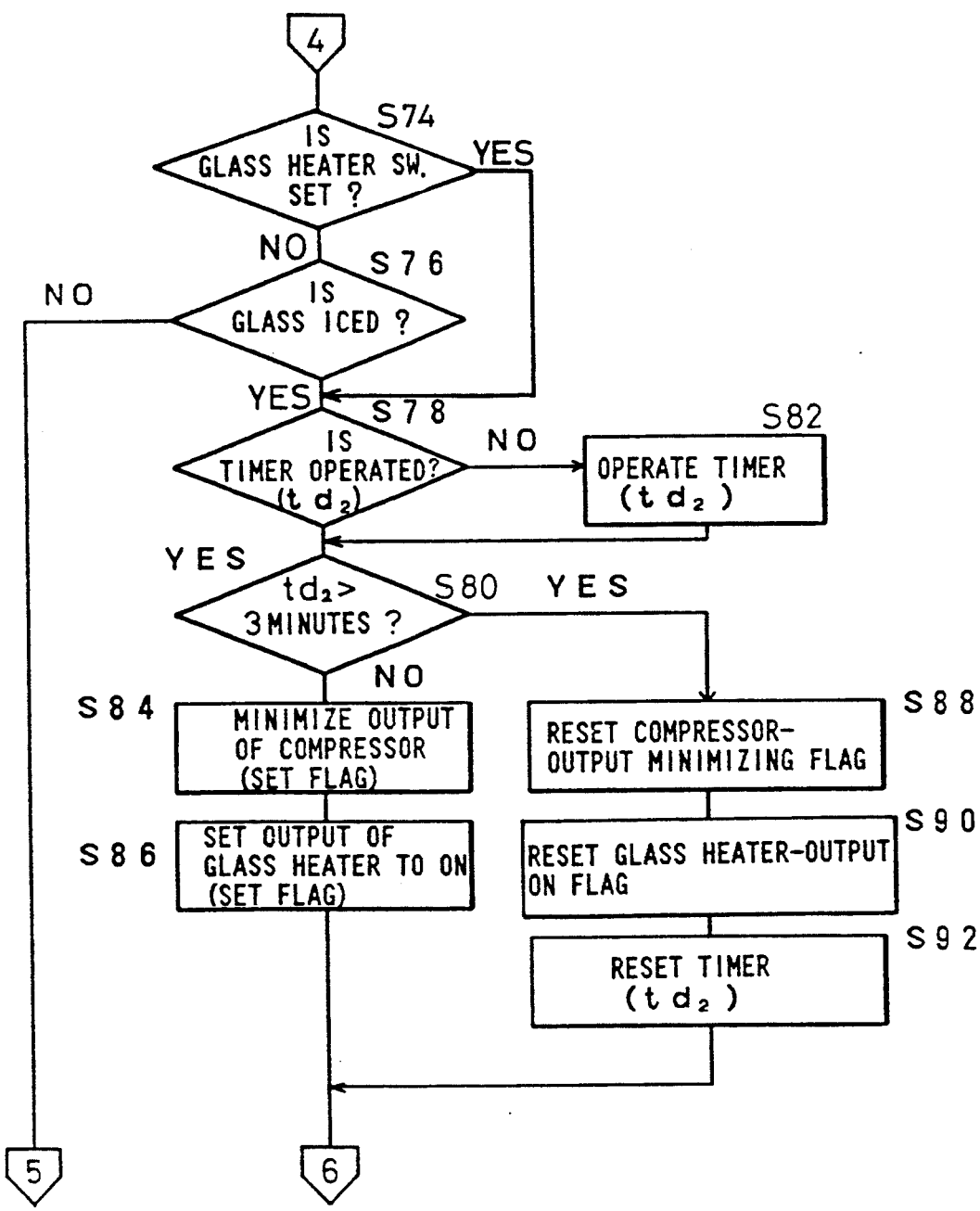
FIG. 10 is a flowchart for describing a further control operation of the embodiment shown in FIG. 1, which is effected under the normal air-conditioning mode.

The following routine procedure is then executed as shown in FIG. 10. It is first determined whether or not the glass heater switch is in a set state (Step S74). If the answer is determined to be No, then the output of the glass icing sensor 55 is read. It is also determined whether or not the front window glass and/or the rear window glass is in the frozen state (Step S76).

If the answer is determined to be Yes in Step S76, it is then determined whether or not a timer $t_{d2}$ for the glass thawing is in operation (Step S78). If the answer is determined to be Yes, it is then judged whether or not the elapsed time of the timer $t_{d2}$ is over three minutes (Step S80).

If the answer is determined to be Yes in Step S74, it is then determined in Step S78 whether or not the timer $t_{d2}$ is being operated. If the answer is determined to be No, then the timer $t_{d2}$ is activated (Step S82) and a timer monitoring routine in Step S80 is executed.

In the timer monitoring routine of Step S80, when the elapsed time of the timer $t_{d2}$ falls within three minutes, a flag for minimizing the output of the compressor 30 of the air conditioner is set (Step S84). Further, the glass heater attached to the front window glass and/or the rear window glass is energized and a flag corresponding to a glass heater operating mode is set (Step S86).

When the front window glass and/or the rear window glass is in the iced state even if a glass heater operating time interval is over three minutes, it is determined that the state of icing is unusual or improper. Thus, the compressor 30 of the air conditioner is returned to the normal state and a flag corresponding to a compressor output minimizing mode is reset (Step S88). Then, the glass heaters are deenergized and the flag for the glass heater operating mode is reset (Step S90). Further, the timer $t_{d2}$ is reset (Step S92).

Figure 11:
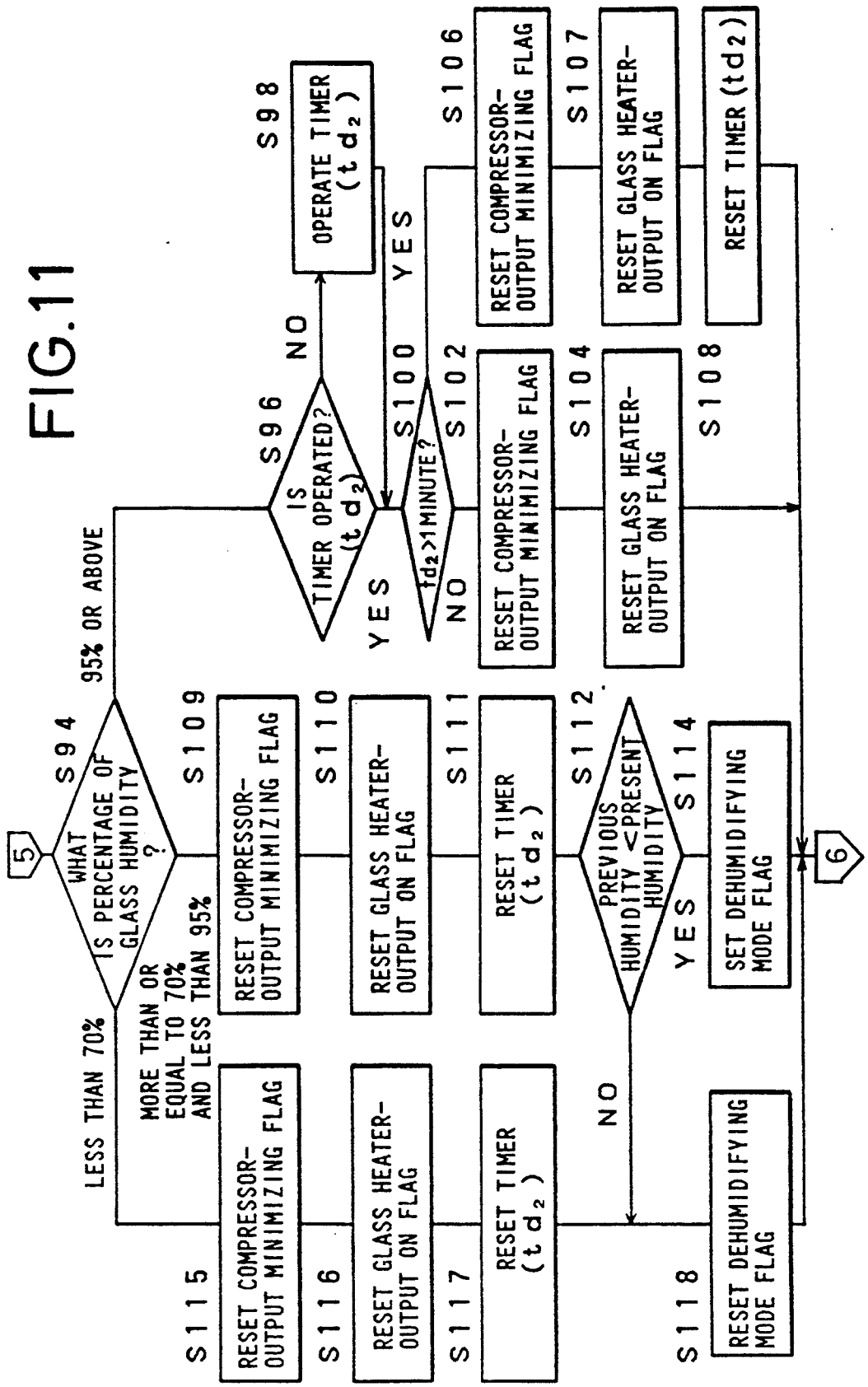
FIG. 11 is a flowchart for describing a still further control operation of the embodiment shown in FIG. 1, which is made under the normal air-conditioning mode.

When the front window glass and/or the rear window glass is in a deiced state, a control method as illustrated in FIG. 11 is divided according to the humidity of the glass surface, which has been detected by the humidity sensor 54 (Step S94).

If the glass surface humidity is 95% or above in Step S94, it is then determined that the front window glass and/or the rear window glass are in a foggy state. It is then determined whether or not the timer $t_{d2}$ set in Step S80, is in operation (Step S96). If the answer is determined to be Yes, it is then judged whether or not the elapsed time of the timer $t_{d2}$ is over one minute (Step S100). If the answer is determined to be No, then the output of the compressor 30 is minimized and the flag corresponding to the compressor output minimizing mode is set (Step S102). Then, the flag corresponding to the glass heater operating mode is set to energize the glass heater of the front window glass and/or the window rear glass (Step S104).

When the glass surface humidity is 95% or above even if the elapsed time of the timer $t_{d2}$ is over one minute, the flag corresponding to the mode for minimizing the output of the compressor 30 is reset so as to return the compressor 30 of the air conditioner to the normal state (Step S106). Then, the flag for the glass heater operating mode is reset to deenergize the glass heater (Step S107). Further, the timer $t_{d2}$ for activating the glass heater is reset (Step S108).

If a normal foggy state exists in this case, then the front window glass and/or the rear window glass can be cleared of the foggy state by energizing the glass heater for one minute. When, however, the front window glass and/or the rear window glass cannot be cleared from the fog condensation by energizing the glass heater for one minute, it is determined that a peculiar or unusual state has been developed. Thus, the glass heater, which requires large power, is inactivated.

If it is determined in Step S94 that the glass surface humidity is more than or equal to 70% and less than 95%, then the mode flag for minimizing the output of the compressor 30 is reset (Step S109). Then, the flag corresponding to the glass heater operating mode is reset (Step S110). Thereafter, the timer $t_{d2}$, which has been set in Step S80, is reset (Step S111). Further, the valve read as the present humidity is compared with the previous humidity (Step S112). If the previous humidity is less than the present humidity in percentage (i.e., the previous humidity < the present humidity), then a flag corresponding to a dehumidifying mode is set (Step S114). If, on the other hand, the present humidity is smaller than the previous humidity in percentage, then the flag corresponding to the set dehumidifying mode is reset (Step S118).

Further, if the humidity read in Step S94 is less than 70%, then the flag corresponding to the mode for minimizing the output of the compressor 30 is set (Step S115). Then, the flag corresponding to the glass heater operating mode is reset (Step S116) and the timer $t_{d2}$ is reset (Step S117). If the flag for the dehumidifying mode is up (set), it is then reset (Step S118).

When the respective processes at Steps S86 and S92 in the glass-icing releasing routine and Steps S104, S108, S114 and Step S118 in the glass fog-condensation releasing routine are completed, the CPU 62 corrects the set temperature based on the read data (Step S120) and then corrects the set temperature in accordance with a computation subroutine so as to bring the vehicle room into a comfortable state (Step S122) as illustrated in FIG. 12.

A process for selecting any one of the operating or control modes is next executed. It is first determined whether or not the DRY switch 76h is in an ON state (Step S124). If the answer is determined to be Yes, then the first dehumidifying mode is selected (Step S126). If the answer is determined to be No in Step S124, then the room temperature $T_R$ which has been read in Step S52 and the corrected target temperature $T_{S1}$ are computed (Step S128). A routine processing method is divided according to the result of that computation.

If $T_R - T_{S1} > 2°$ C., the outside air or atmospheric temperature $T_{AM}$ which has been read by the atmospheric temperature sensor 60 in Step S56, is then compared with the room temperature $T_R$ (Step S130). If $T_{AM} > T_R - 5°$ C., then the control mode is determined as the cooling mode (Step S132) because the room temperature $T_R$ is higher than the target temperature $T_{S1} + 2°$ C. (i.e., $T_R > T_{S1} + 2°$ C.) and the atmospheric temperature $T_{AM}$ is higher than the room temperature $T_R - 5°$ C. (i.e., $T_{AM} > T_R - 5°$ C.).

If it is determined in Step S130 that $T_{AM}$ is lower than $T_R - 5°$ C. (i.e., $T_R > T_{S1} + 2°$ C. and $T_{AM} < T_R - 5°$ C.), then the ventilating mode is selected (Step S136).

If, on the other hand, it is determined in Step S128 that $T_R - T_{S1} < -2°$ C., then the atmospheric temperature $T_{AM}$ which has been read by the atmospheric temperature sensor 60 in Step S56 and the room temperature $T_R$ are compared (Step S134). If $T_{AM} > T_R + 2°$ C., then the room temperature $T_R$ can be set to the target temperature $T_{S1}$ because the room temperature $T_R$ is lowered 2° C. or more from the corrected target temperature $T_{S1}$ and the atmospheric temperature $T_{AM}$ is higher than the room temperature $T_R + 2°$ C. Therefore, the control mode is determined as the ventilating mode (Step S136).

If $T_{AM} > T_R + 2°$ C. is not met in Step S134, i.e., if the room temperature $T_R$ is lower than a target temperature $T_{S1} - 2°$ C. and the atmospheric temperature $T_{AM}$ is lower than the room temperature $T_R + 2°$ C., it is then determined whether or not the dehumidifying flag is up (set) (Step S138). If the answer is determined to be No, it is then judged whether or not the difference between the room temperature $T_R$ which has been read by the room temperature sensor 56 and the target temperature $T_{S1}$ which has been set in the RAM 64 in advance is lower than −5° C. (Step S139).

If it is determined that $T_R - T_{S1} < -5$, it is then judged whether or not the flag for the seat heater switch is up (set) (Step S140). If the answer is determined to be Yes, then a seat heater output flag is set (Step S141) and the heating mode is selected (Step S142).

When $T_R - T_{S1} < -5$ is not met in Step S139 or when it is determined based on the result of determination in Step S140 that the seat heater switch flag is down (reset), this flag is reset (Step 8143) and the seat heater output flag is also reset (Step S144). Then, a process for determining the control mode as the heating mode is executed in Step S142.

When the dehumidifying flag is up (set) in Step S138, the control mode is determined as the second dehumidifying mode (Step S145).

If it is determined based on the result of the computation in Step S128 that the absolute value of the difference between the room temperature $T_R$ and the target temperature $T_{S1}$ is smaller than 2° C. (i.e., $|T_R - T_S| \leq 2°$ C.), it is then judged that the temperature of the room is substantially equal to the target temperature $T_{S1}$. It is further determined in Step S114 whether or not the dehumidifying flag is up (set) (Step S146). If the answer is determined to be Yes in Step S146, it is then determined in Step S126 that the first dehumidifying mode has been selected. If the answer is determined to be No, it is then judged that a mode for halting the operation of the air conditioner has been selected (Step S147).

The modes for controlling the cooling, the heating, the dehumidification, the ventilation and the halt are successively selected according to the above-described Steps. The flag for controlling the air conditioner is set in accordance with each mode selected.

Figure 13:
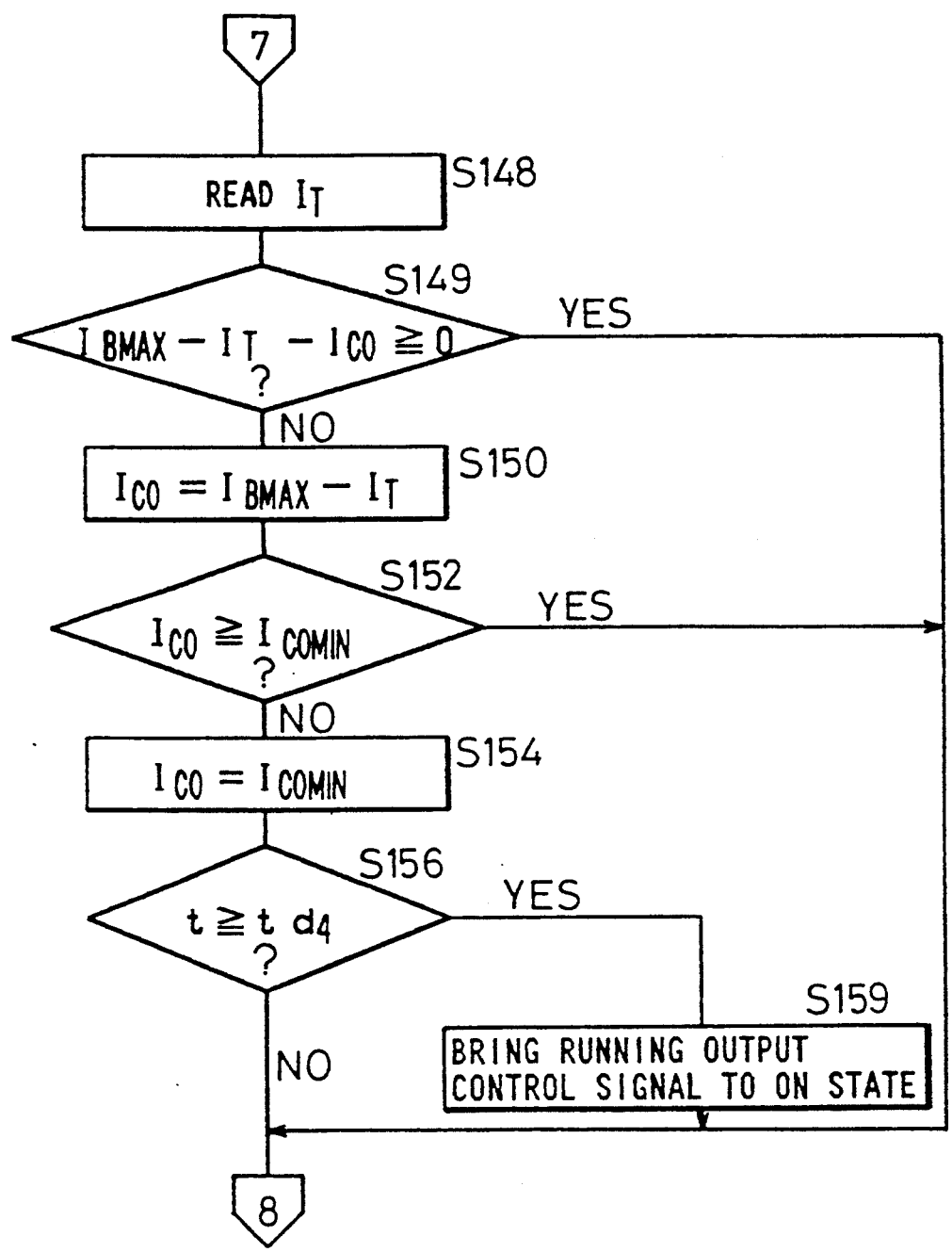
FIG. 13 is a flowchart for describing a still further control operation of the embodiment illustrated in FIG. 1, which is executed under the normal air-conditioning mode.

Next, a process for controlling the power to be used when the vehicle is running, is executed as shown in FIG. 13. First, load current $I_T$, which flows in each of the drive devices such as a motor M for the running the vehicle, electrical equipment other than the compressor 30, etc., is read (Step S148). It is then determined whether or not the total output current $I_A$ corresponding to the sum of the load current $I_T$ and current $I_{CO}$ consumed by the compressor 30 exceeds the maximum discharging current $I_{BMAX}$ of the battery 48 (Step S149). If the answer is determined to be Yes (see the broken line of a curve indicative of the total output current $I_A$ in FIG. 14), then the battery 48 is in danger of damage. It is therefore necessary to reduce the total output current $I_A$ ($I_T + I_{CO}$).

Figure 14:
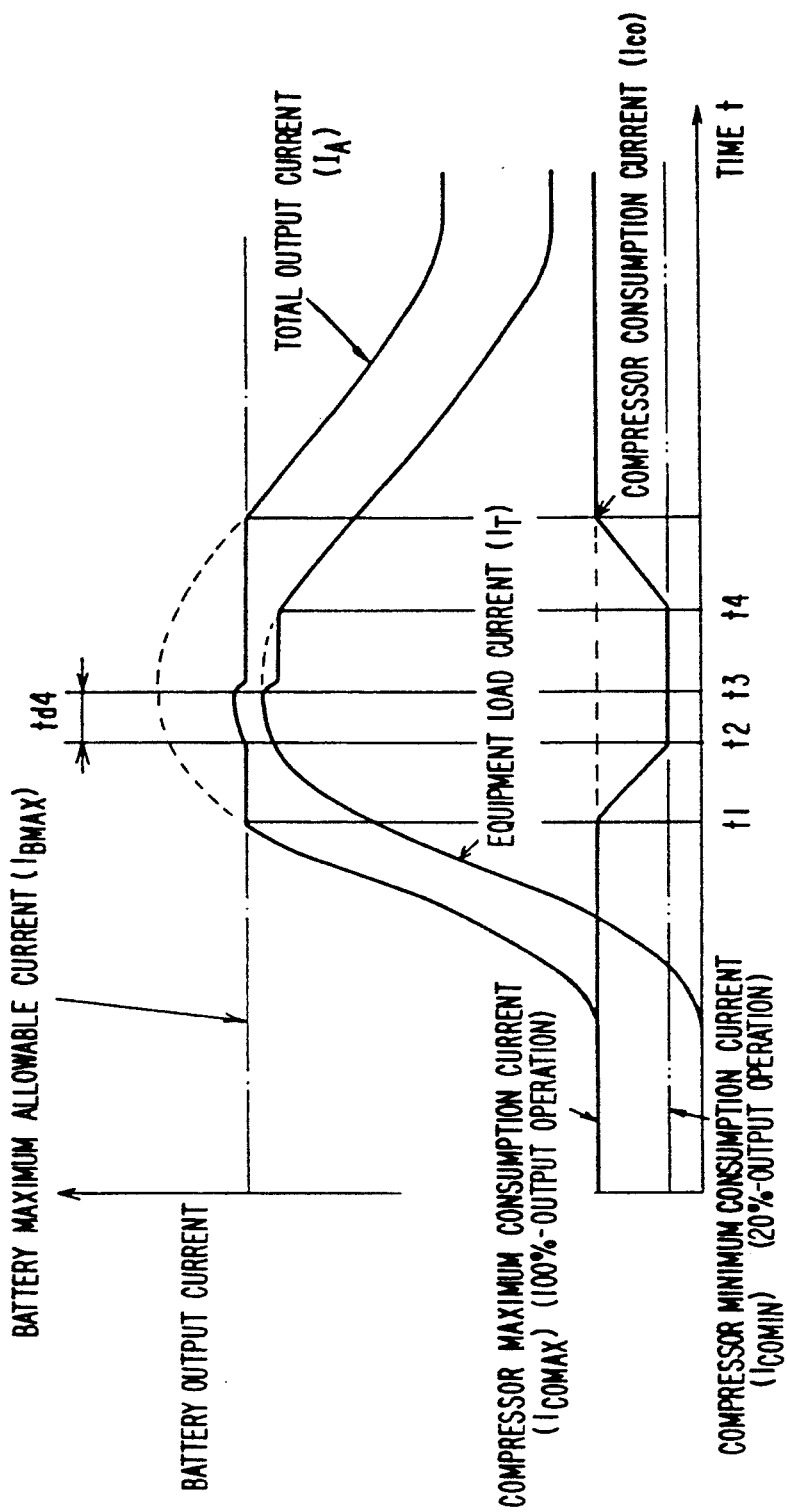
FIG. 14 is a diagram for describing the control of output current of a battery, which is effected under the normal air-conditioning mode shown in FIG. 12.

In order to maintain acceleration performance at a constant level, the current $I_{CO}$ of the compressor 30 is set to a current value obtained by subtracting the load current $I_T$ from the maximum discharging current $I_{BMAX}$ (see a time interval between times $t_1$ and $t_2$ with respect to the current $I_{CO}$ in Step S150 and FIG. 14). When, however, the compressor 30 is inactivated, a difference in pressures of the refrigerant which exist before and after the compressor 30, is reduced and a desired time interval is required to restart the compressor 30, so that the power of the air conditioner is reduced.

It is therefore determined whether or not the current $I_{CO}$ of the compressor 30 exceeds the minimum consumption current $I_{COMIN}$ which enables the compressor 30 to be continuously driven (Step S152). If the above condition is not met, then the operation of the compressor 30 is stopped. Therefore, the current $I_{CO}$ is regarded as the minimum consumption current $I_{COMIN}$ (see a time interval between times $t_2$ and $t_4$ with respect to the current $I_{CO}$ in Step S154 and FIG. 14).

In this case, the total output current $I_A$ corresponding to the sum of the current $I_{CO}$ and the load current $I_T$ exceeds the maximum discharging current $I_{BMAX}$ of the battery 48 as shown in FIG. 14. It is therefore determined whether or not the excess time interval t falls within the allowable time interval $t_{d4}$ which does not exert a bad influence on the life of the battery 48 or the like (Step S156). If the answer is determined to be Yes, then the glass heater is controlled if a glass heater output-ON flag is up (set) (Step S157). If a seat heater output flag is up (set), then the control of the seat heater is effected (Step S158).

Figure 15:
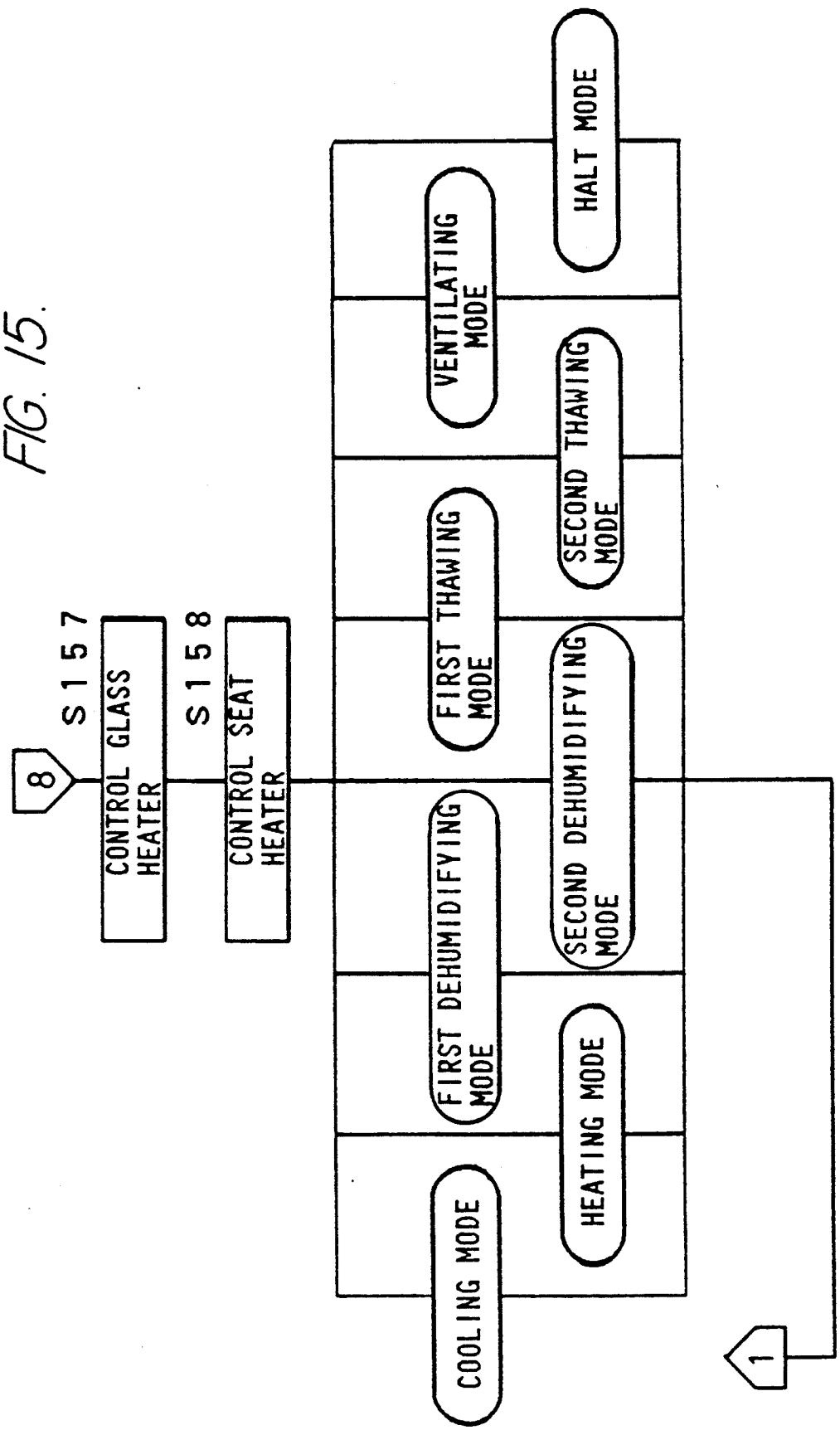
FIG. 15 is a flowchart for describing a still further control operation of the embodiment shown in FIG. 1, which is executed under the normal air-conditioning mode.
Figure 16:
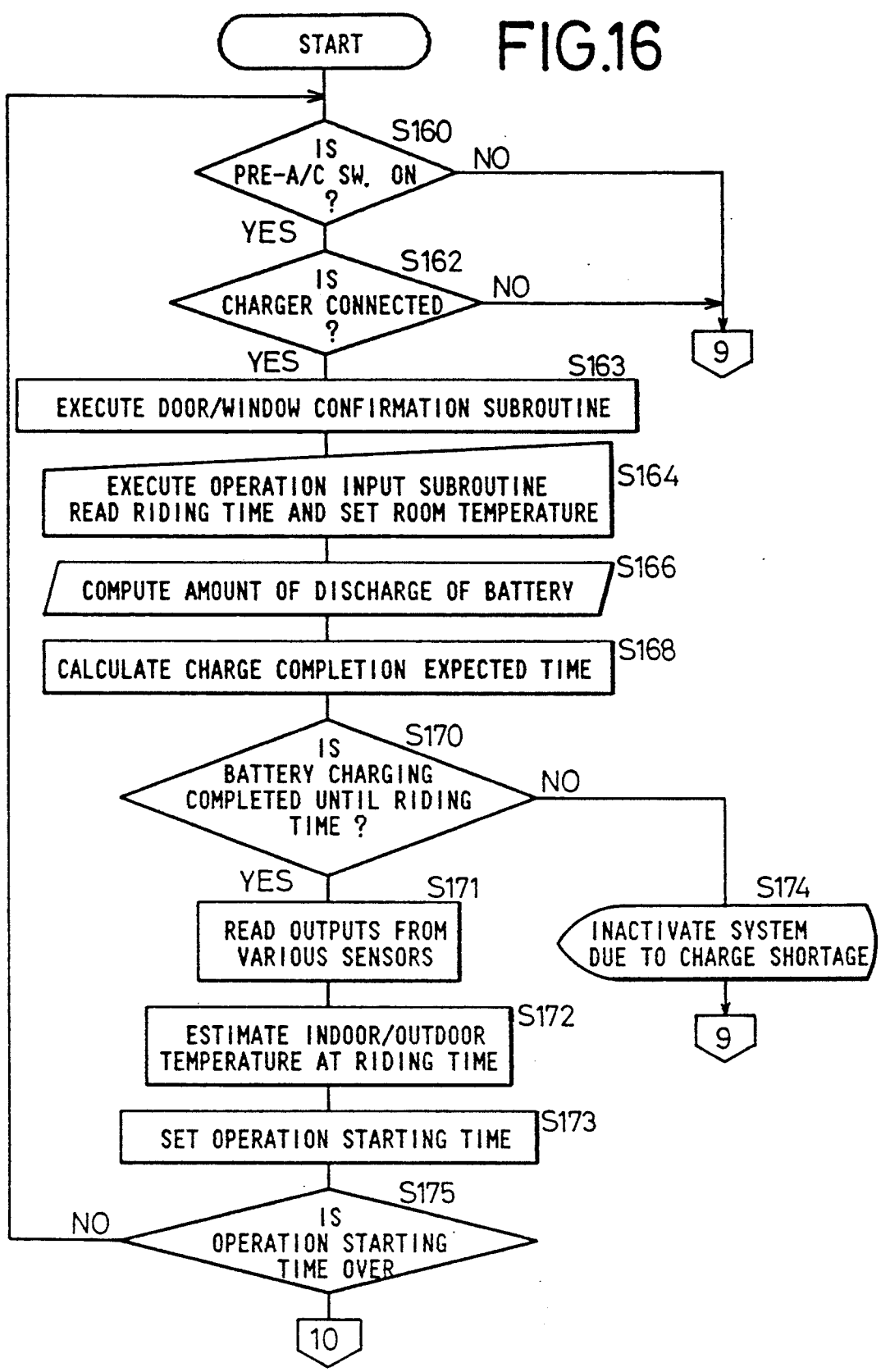
FIG. 16 is a flowchart for describing a portion of the entire operation of the embodiment depicted in FIG. 1, which is made under a pre-air-conditioning mode.

Further, a control mode under which a flag has been set, which is selected from respective control modes shown in FIG. 15, is executed.

When it is determined in Step S156 that the excess time interval t exceeds the allowable time interval $t_{d4}$, a running output restriction signal is outputted so as to restrict the output of the motor for the running of the vehicle, thereby controlling the total output current $I_A$ so as to be brought to the maximum discharging current $I_{BMAX}$ or less as represented by a time interval between times $t_3$ and $t_4$ with respect to the load current $I_T$ shown in FIG. 14 (Step S159). Then, the control of the glass heater is effected in Step S157.

When the condition in Step S149 is met and it is determined from the result of the determination in Step S149 that the total output current $I_A$ is not more than the maximum discharging current $I_{BMAX}$ of the battery 48, the process for controlling the glass heater is executed in Step S157.

As described in the operation input subroutine (Step S40), when the switches 76c, 76e, 76f, 76g of the control panel 74 are selected in advance, the mode for actuating the selected switch takes preference over the respective control modes. Even if the air conditioner is automatically controlled so as to select the heating mode, for example, each damper is controlled so as to introduce the outside air into the room so long as the outside air introducing changeover switch of the inside/outside air changeover switches 76e is selected.

The pre-A/C control for effecting the air conditioning of the vehicle room before the vehicle runs will now be described.

FIGS. 16 through 19 show a fragmentary flowchart for describing the pre-A/C control.

The pre-air con is normally effected during a period in which the battery 48 is being charged during extended parking or the like at night. The temperature and the humidity or the like inside the vehicle room are controlled until the vehicle is driven by a driver next time to thereby set or prepare comfortable room circumstances when the driver rides in his/her vehicle.

The pre-A/C switch (see FIG. 4) of the control switches 76b is first turned ON (Step S160). When an unillustrated charger is connected to the battery 48 (Step S162), the charging of the battery 48 by the charger through the external power supply is initiated.

Figure 17:
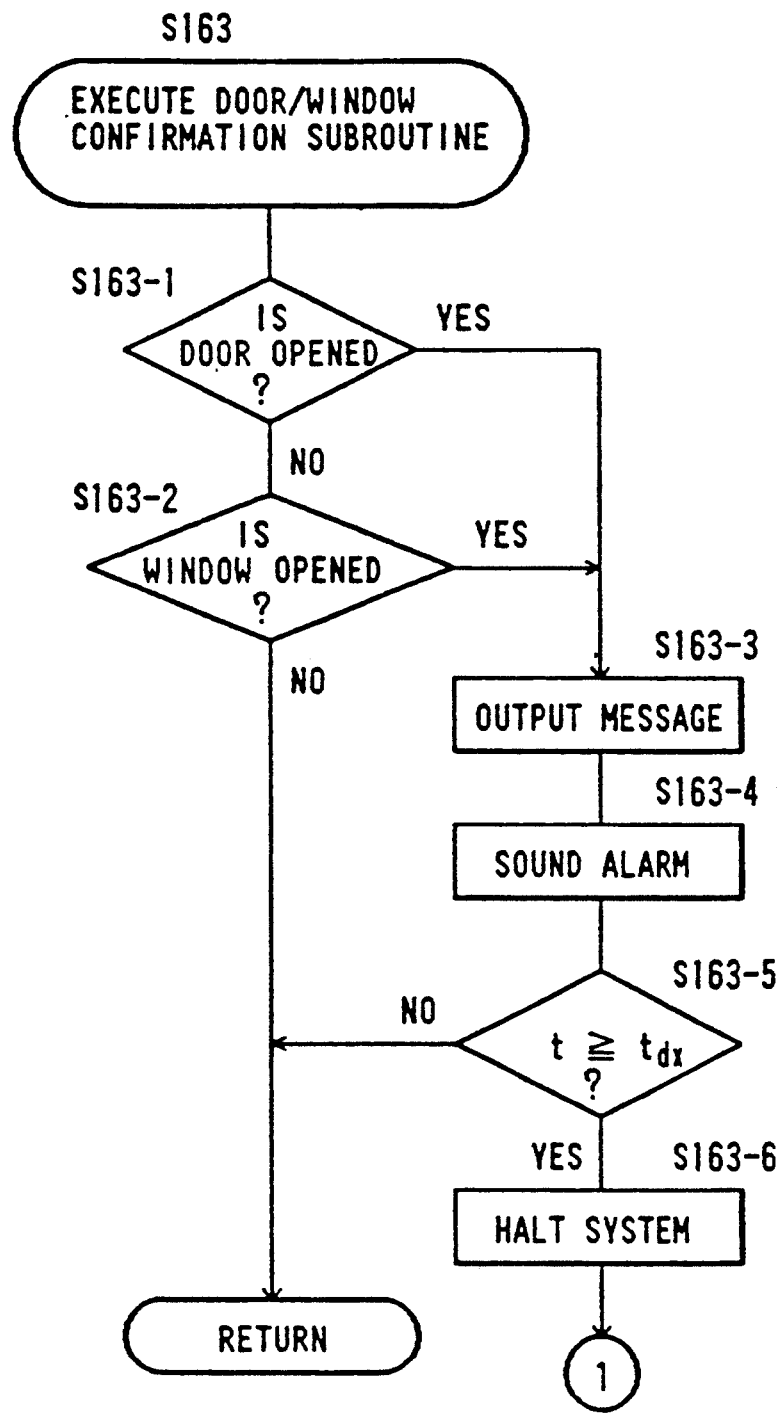
FIG. 17 is a flowchart for describing the operation for control of a door/window confirmation subroutine shown in FIG. 16 which is executed under the pre-air-conditioning mode.

At this time, the CPU 62 executes a door/window confirmation subroutine as illustrated in FIG. 17 (Step S163). That is, the CPU 62 reads information outputted from the door opening/closing sensor 57 and the window opening/closing sensor 58 and determines based on the read information whether the door is in an opened state (Step S163-1) or the window is opened (Step S163-2). If it is determined that the door is in the opened state, then a message indicative of "The door is now open and hence please close the door" is displayed on the liquid crystal display panel 76a (Step S163-3). If it is determined that the window is open, then a message indicative of "The window is now open and hence please close the window" is displayed on the liquid crystal display panel 76a in Step S163-3. In addition, a buzzer is energized so as to sound an alarm indicative of the fact that the door and/or the window is in the opened state (Step S163-4).

After it has been detected that the door and/or the window is in the opened state, it is determined whether or not a time interval $t_{dz}$ (e.g., $t_{dz}=3$ minutes) has elapsed (Step S163-5). When the door and/or the window is closed during a period of three minutes, the sounding of the alarm is stopped and the pre-air con control is halted (Step S163-6).

If the door and/or the window is closed within three minutes, then the CPU 62 reads the time for riding in the vehicle for the next morning, which has been set in a factory or the like in advance and the set temperature of the room at that riding time from the RAM 64, and displays the same on the liquid crystal display panel 76a of the control panel 74.

Figure 20:
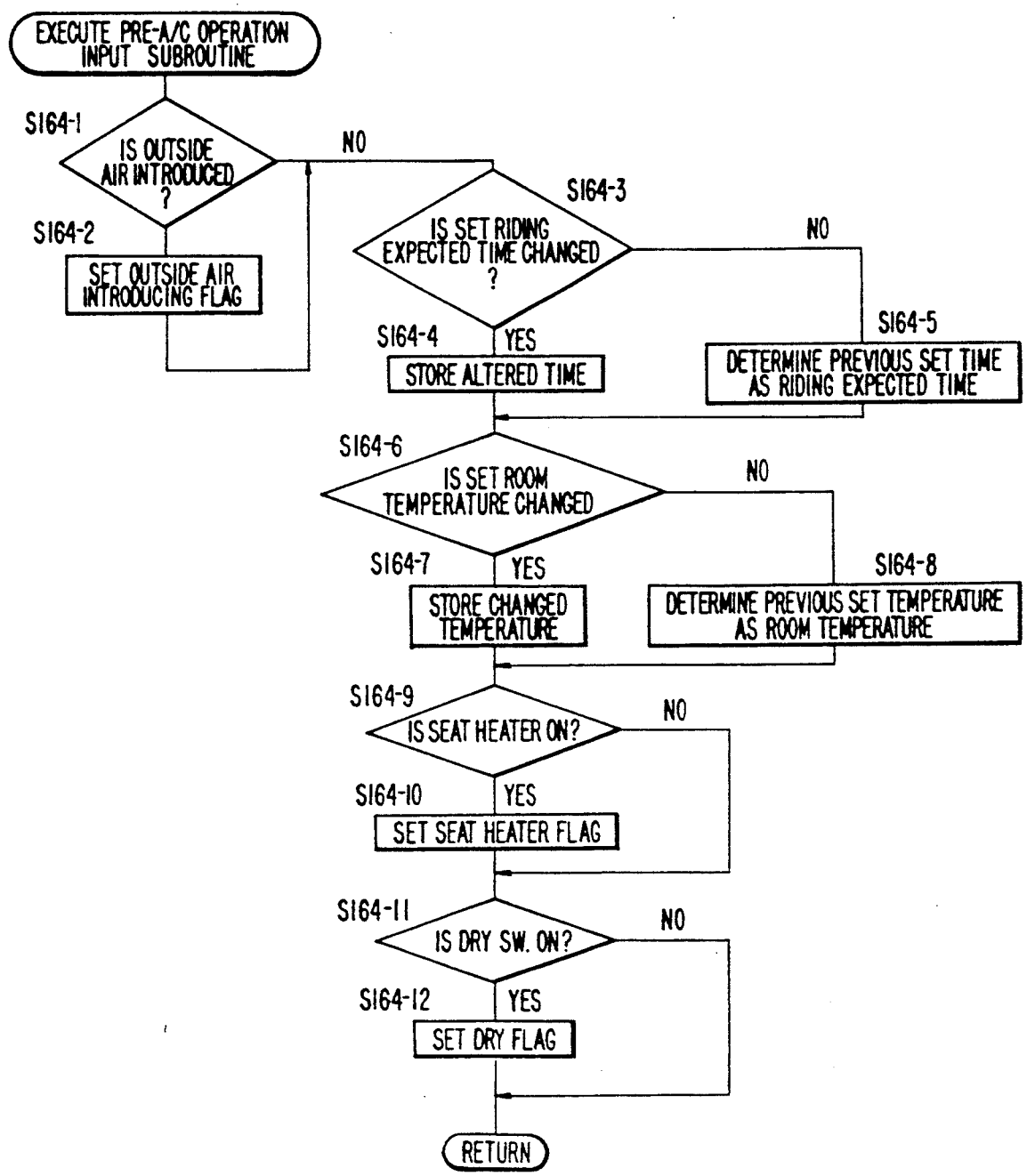
FIG. 20 is a flowchart for describing the operation for control of an operation input subroutine which is executed under the pre-air-conditioning mode shown in FIGS. 16 through 19.
Figure 21:
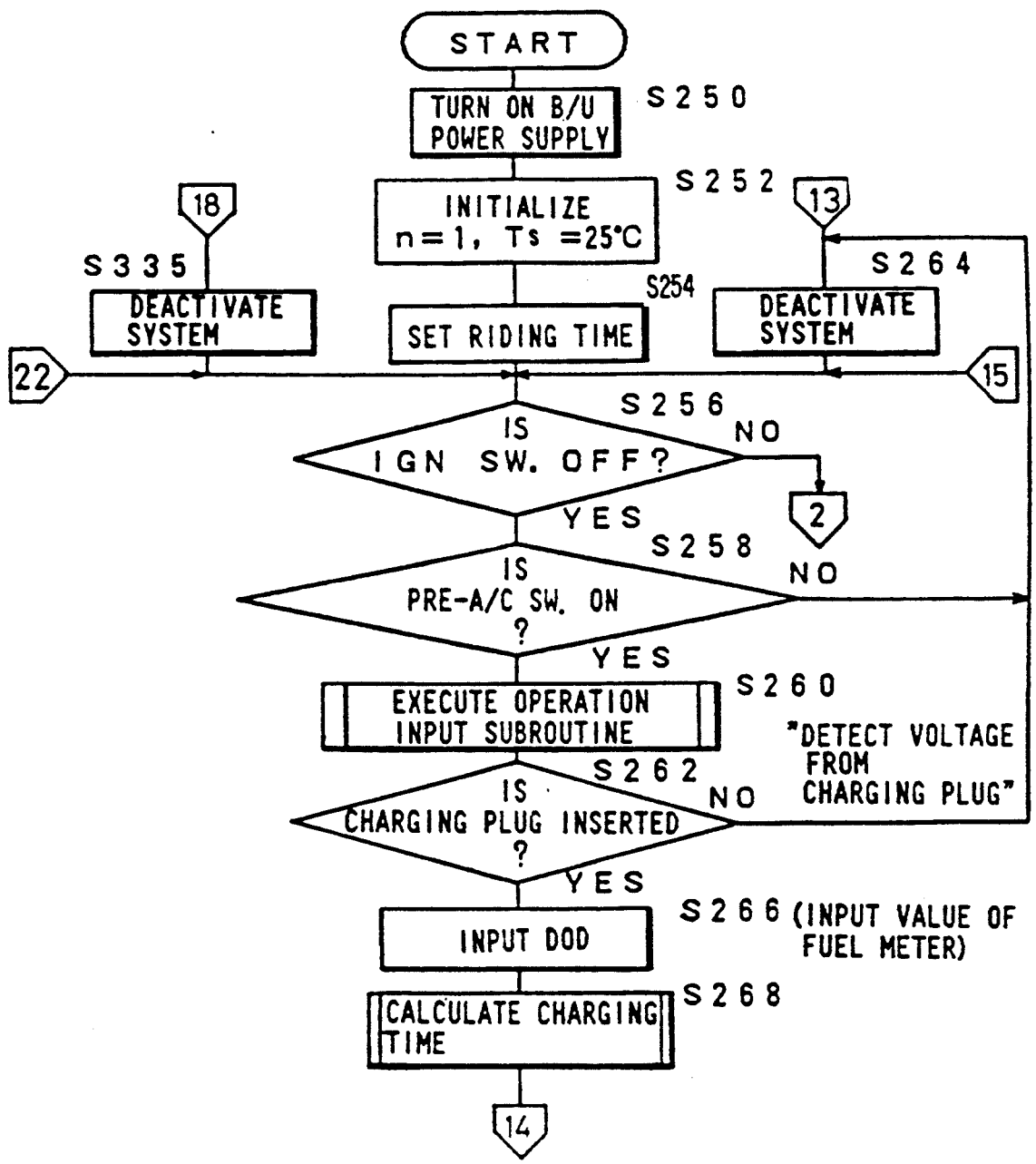
FIG. 21 is a flowchart for describing a control operation of the embodiment shown in FIG. 1, which is performed under the pre-air-conditioning mode.
Figure 22:
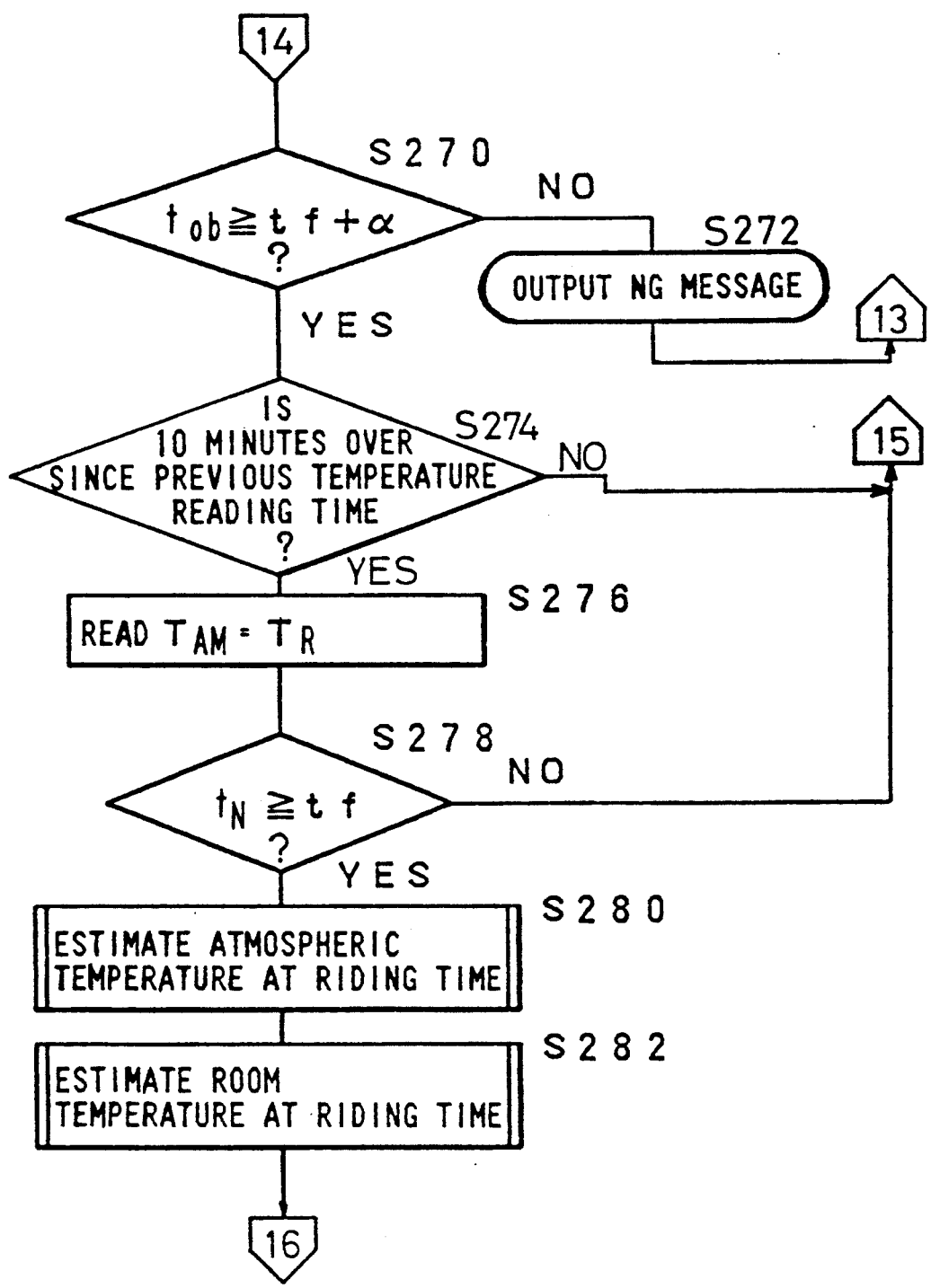
FIG. 22 is a flowchart for describing another control operation of the embodiment shown in FIG. 1, which is effected under the pre-air-conditioning mode.

These displayed contents can be changed according to the operation of the switch 76c of the control panel 74 and the operations of the switches and the like provided at the section 76d of the control panel 74. This operation input subroutine (Step S164) now will be described with reference to FIG. 20.

The CPU 62 make a decision as to whether or not the outside air introducing switch of the inside/outside air changeover switches 76e is in an operated state (Step S164-1). If the answer is determined to be Yes, then an outside air introducing flag is set (Step S164-2). It is then determined whether or not the initial value of the previously-set riding expected time $t_{ob}$, for example, 7:00 AM has been changed (Step S164-3). If the answer is determined to be Yes, then the altered time is stored in the RAM 64 as data (Step S164-4). If the answer is determined to be No, then the previously-set time, i.e., 7:00 AM is set as the riding expected time rob (Step S164-5).

It is next determined whether or not a room temperature $T_S$, which has been set at the predetermined riding expected time $t_{ob}$, for example, $T_S=25°$ C. has been changed (Step S164-6). If the answer is determined to be Yes, then the altered set temperature is stored in the RAM 64 as data (Step S164-7). If the answer is determined to be No, then the previously-set temperature, i.e., 25° C. is regarded as the set value of the room temperature $T_S$ (Step S164-8).

It is further determined whether or not the seat heater switch (see 76i in FIG. 4) is in an operated state (Step S164-9). If the answer is determined to be Yes, then the seat heater flag is set (Step S164-10). It is then determined whether or not the DRY switch (see 76h in FIG. 4) is in an operated state (Step S164-11). If the answer is determined to be Yes, then a DRY flag is set (Step S164-12).

Next, the CPU 62 computes the amount $I_d$ of discharge of the battery 48 from a depth-of-discharge value of the battery 48, which has been read by the depth-of-discharge sensor 59 (Step S166). A time interval H required to charge the battery 48 is calculated in accordance with the following equation (1):

$$H = (I_d/I_{ch}) \times K_1 \qquad (1)$$

In the equation (1), $I_{ch}$ represents the rated charge or charging current (A/H) and $K_1$ represents a charging-efficiency factor set according to the kind of battery 48.

Charge completion time is calculated from the charging time interval H which has been determined from the equation (1) and the present time which has been read from the clock of the section 76d on the control panel 74 (Step S168). It is then determined whether or not the charging of the battery 48 will be completed by the riding expected time $t_{ob}$ which has been read from the RAM 64 (Step S170). If the answer is determined to be Yes, then the outputs of various sensors are read in accordance with a sensor output read subroutine similar to that to be executed in Steps 345 through 350 which will be described later (Step S171).

Further, the CPU 62 estimates the atmospheric temperature $T_{AM}$ at the riding time and the room temperature $T_R$ at which the air conditioner is inactivated, from the computation which will be described later (Step S172). Then, the time for starting the operation of the pre-air conditioning system is set based on the estimated temperatures $T_{AM}$ and $T_R$ (Step S173). If the answer is determined to be No in Step S170, then the battery 48 is charged and the pre-air conditioning system is inactivated (Step S174).

Figure 18:
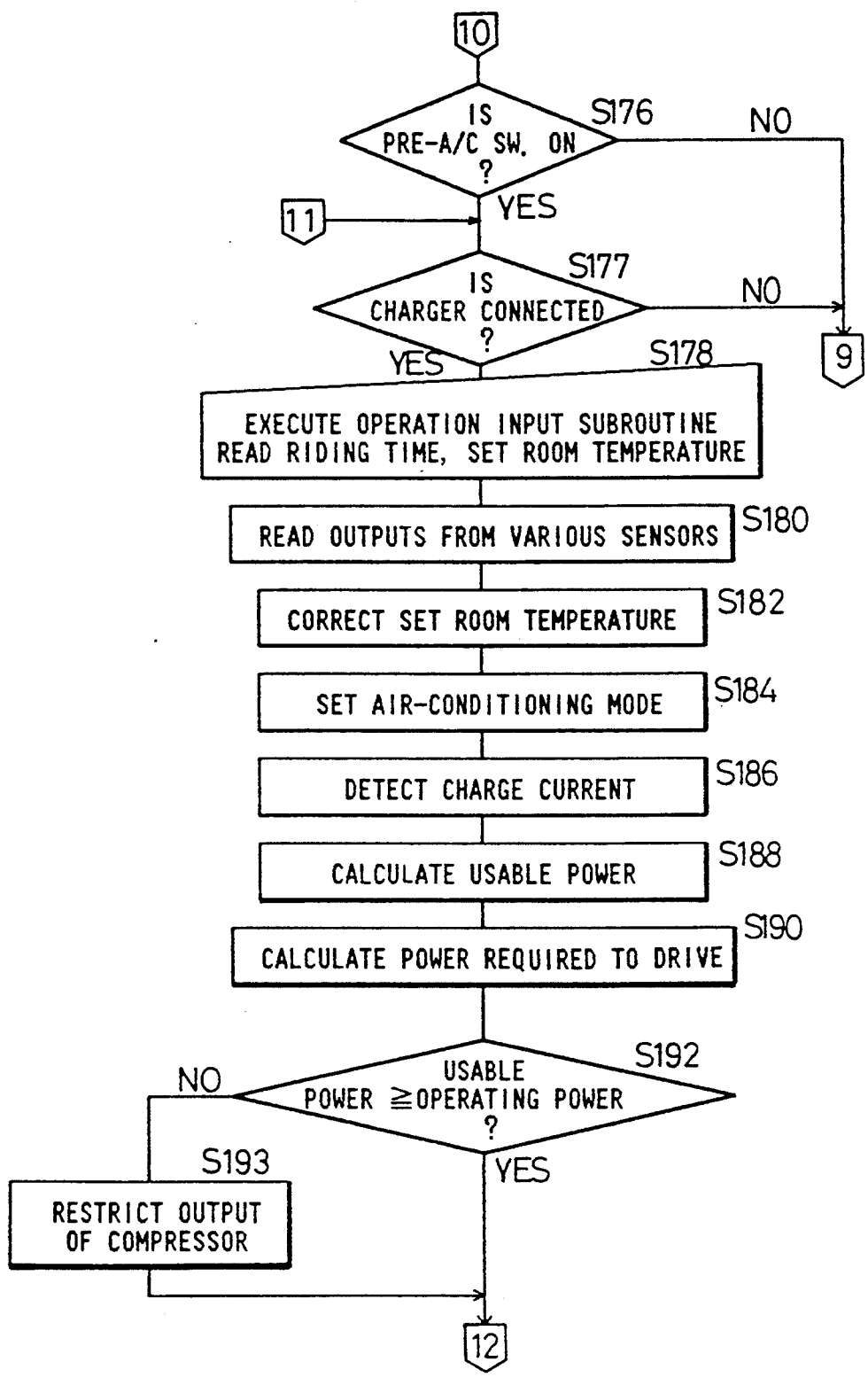
FIG. 18 is a flowchart for describing a portion of the entire operation of the embodiment shown in FIG. 1, which is executed under the pre-air-conditioning mode.

The CPU 62 makes a regular judgment as to whether or not the present time has reached the set time for starting the operation of the air conditioner (Step S175). If the answer is determined to be Yes, then Steps similar to Steps S160, S162 and S164 are executed, as illustrated in FIG. 18. That is, it is determined whether or not the pre-A/C switch is in an ON state (Step S176) and the charger is in a connected state (Step S177). Further, the operation input subroutine (Steps S164-1 through S164-12) is executed to thereby read information about a change in input setting (Step S178). Further, the outputs of the various sensors are read in accordance with the sensor output read subroutine (Steps S345 through S350)(Step S180). The room temperature, which has been estimated and set in Step S174 based on the room temperature read by the room temperature sensor 56 is corrected (Step S182). Further, an air-conditioning mode is set based on the detected room temperature $T_R$ and atmospheric temperature $T_{AM}$ (Step S184).

Next, the charge or charging current, which is supplied to the battery 48 from the charger, is detected Further, the maximum value of the usable power corresponding to the difference between the maximum energization current and the present charging current is calculated from the detected charging current (Step S188). The power required to operate the air conditioner is then calculated (Step S190). It is also determined whether the usable power is more than or equal to the operating power (Step S192). If the answer is determined to be Yes (i.e., if the usable power ≧ the operating power), then the CPU 62 effects air-conditioning control as shown in FIG. 19, to control of the four-way type valve 22 and the bypass valves 18, 24, 26 (Step S194), output control of the compressor 30 of the air conditioner (Step S196), opening and closing control of the dampers 36 through 46 (Step S198), output control of the blower fans 32, 34 (Step S200) and control of the seat heater (Step S201) or the like.

Figure 19:
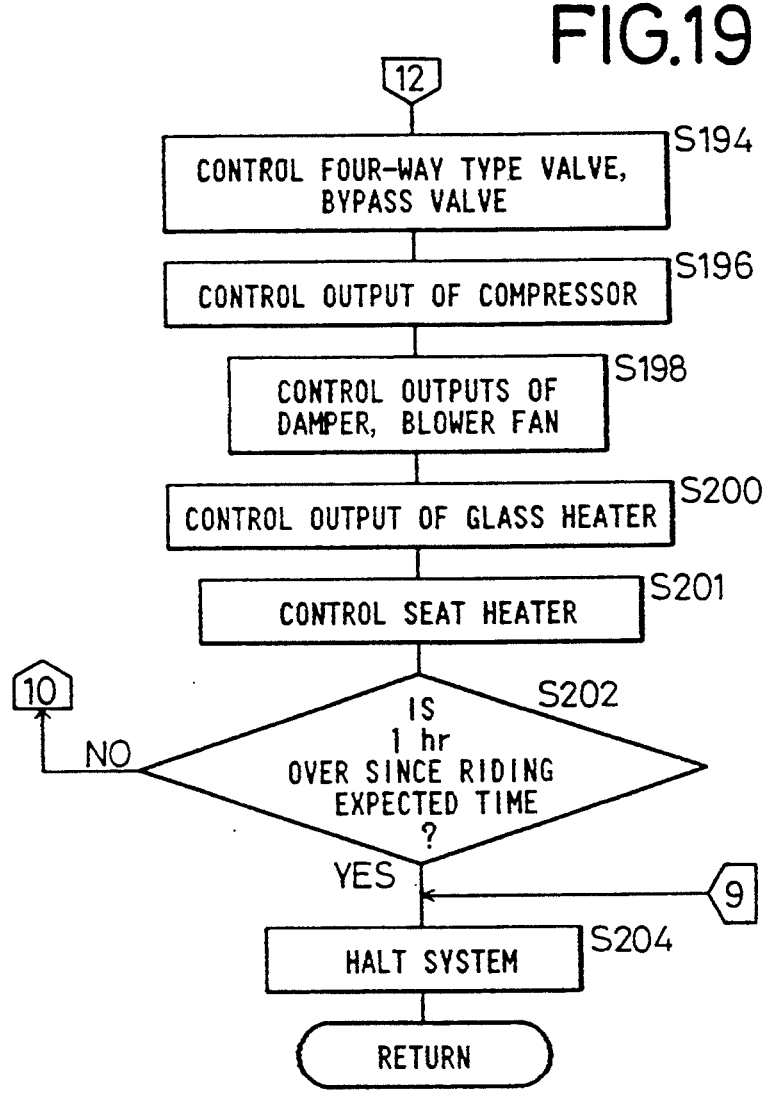
FIG. 19 is a flowchart for illustrating a portion of the entire operation of the embodiment depicted in FIG. 1, which is carried out under the pre-air-conditioning mode.

If the answer is determined to be No in Step S192, then the CPU 62 restricts the output of the compressor 30 of the air conditioner (Step S193) and effects the control of the four-way type valve 22 and the bypass valves 18, 24, 26 in Step S194, as illustrated in FIG. 19.

The CPU 62 makes a decision as to whether or not one hour has elapsed since the riding expected time (Step S202). If the answer is determined to be Yes, then the air conditioning system is inactivated (Step then the air conditioning system is inactivated (Step S204). If the air conditioner is in operation over one hour since the riding expected time, it is then determined that the riding expected time of the driver has been changed. Thus, the operation of the air conditioner is stopped so as to save the electrical energy used by the air conditioner.

If, on the other hand, the answer is determined to be No in Step S202, then the routine proceeds to Step S176 where the CPU 62 makes a judgment as to whether or not the pre-A/C switch is in the ON state (Step S176). Further, the CPU 62 monitors whether or not the charger is still connected to the battery 48 (Step S177). When the pre-A/C switch is turned OFF or the charger is disconnected from the battery 48, the air conditioning system is inactivated in Step S204. Further, when a change in setting of the riding time and a change in setting of the room temperature $T_R$ are effected during the charging of the battery 48 (Step S178), a change in control is effected based on the change information.

The pre-air con control is effected in accordance with the above-described Steps. Each control will now be described in detail with reference to FIGS. 20 through 27.

In the electric vehicle 10, the initial values related to the pre-air con are set in the manufacturing factory. A backup power supply is electrically connected to a control circuit including the CPU 62 (Step S250). The reference value $T_S$ of the room temperature, for example, 25° C. is set (Step S252). Further, the reference value of the riding expected time $t_{ob}$, for example, 7:00 AM is set (Step S254).

When a driver who is driving the electric vehicle 10 to which the above initial values have been set, turns OFF the ignition switch (Step S256) and turns ON the pre-A/C switch (Step S258) during the charging of the battery 48, the CPU 62 reads the set room temperature $T_S$ and the riding expected time $t_{ob}$ from the RAM 64 and displays the same on the liquid crystal display panel 76a. In this case, the set values of the room temperature $T_S$ and the riding expected time $t_{ob}$ which have been preset in a production line or the like, can be changed by the temperature setting switch 76c and the riding time setting section 76d of the control panel 74. The set values are updated in the RAM 64 each time a change in the set values is made.

That is, the operation input subroutine in Steps S164-1 through S164-12 is executed. Described specifically, it is determined whether or not the riding expected time $t_{ob}$ and the room temperature $T_S$ which has been set at the riding expected time $t_{ob}$, have been changed. It is further determined whether or not the inside/outside air changeover switches 76e, the seat heater switch 76i and the DRY switch 76h have been operated.

It is next determined whether or not a charging plug is in an inserted state (Step S262). If the answer is determined to be No, then the operation of the pre-air conditioning system is stopped until the charging plug is inserted (Step S264) and the routine is returned to Step S256. If the answer is determined to be Yes in Step S262, then a depth-of-discharge (DOD) of the battery 48 is read (Step S266) and the time required to complete the charging of the battery 48 is calculated from the depth-of-discharge (DOD). Further, the expected time $t_f$ required to complete the charging of tile battery 48 is determined in accordance with equation (2) set forth below (Step S268).

Assuming now that the battery 48 is charged by the rated current which enables tile completion of its charging in eight hours when the depth-of-discharge DOD is 80%, the charge completion expected-time $t_f$ is represented as follows:

$$t_f = t_N + 10 \text{ hr} \times DOD \tag{2}$$

where $t_N$ represents the present time.

Next, the riding expected time $t_{ob}$ which has been read in Step S254, is compared with the charge completion expected time $t_f + \alpha$ time (e.g., $\alpha = 1$ hour) (Step S270 in FIG. 22) If $t_{ob} \geq t_f + 1$ hour is not met then the pre-air con acting time is insufficient or short. Therefore, a pre-air con negative message is displayed on the liquid crystal display panel 76a (Step S272) so as to inactivate the pre-air conditioning system (Step S256).

If $t_{ob} \geq t_f + 1$ hour is met, it is then determined that the pre-air con can be effected. Further, a judgment is made as to whether or not 10 minutes have elapsed since the previous temperature was read (Step S274). If the answer is determined to be Yes, then the atmospheric temperature $T_{AM}$ and the room temperature $T_R$ are read (Step S276). It is then determined whether or not the present time $t_N$ has reached the charge completion expected time $t_f$ (Step S278). The processes, which are executed in Steps S256 through S278, are repeatedly effected until the present time $t_N$ reaches the charge completion expected time $t_f$.

If the answer is determined to be Yes in Step S278 (i.e., $t_N \geq t_f$), then an estimated atmospheric temperature $T_{AMOB}$ at the riding expected time $t_{ob}$ is computed based on the following equation (3) using a three-point method depending on the state of a change in the atmospheric temperature $T_{AM}$ which has previously been measured and stored in the RAM 64 (Step S280).

$$T_{AMOB} = T_{AM1} \frac{(t_{ob} - t_{n-1})(t_{ob} - t_n)}{(t_{n-2} - t_{n-1})(t_{n-2} - t_n)} + \tag{3}$$

$$T_{AM2} \frac{(t_{ob} - t_n)(t_{ob} - t_{n-2})}{(t_{n-1} - t_n)(t_{n-1} - t_{n-2})} + T_{AM3} \frac{(t_{ob} - t_{n-2})(t_{ob} - t_{n-1})}{(t_n - t_{n-2})(t_n - t_{n-1})}$$

Similarly to the computation of the estimated atmospheric temperature $T_{AMOB}$, an estimated room temperature $T_{ROB}$ at the riding expected time $t_{ob}$ is computed based on the following equation (4) (Step S282).

$$T_{ROB} = T_{R1} \frac{(t_{ob} - t_{n-1})(t_{ob} - t_n)}{(t_{n-2} - t_{n-1})(t_{n-2} - t_n)} + \tag{4}$$

$$T_{R2} \frac{(t_{ob} - t_n)(t_{ob} - t_{n-2})}{(t_{n-1} - t_n)(t_{n-1} - t_{n-2})} + T_{R3} \frac{(t_{ob} - t_{n-2})(t_{ob} - t_{n-1})}{(t_n - t_{n-2})(t_n - t_{n-1})}$$

Figure 23:
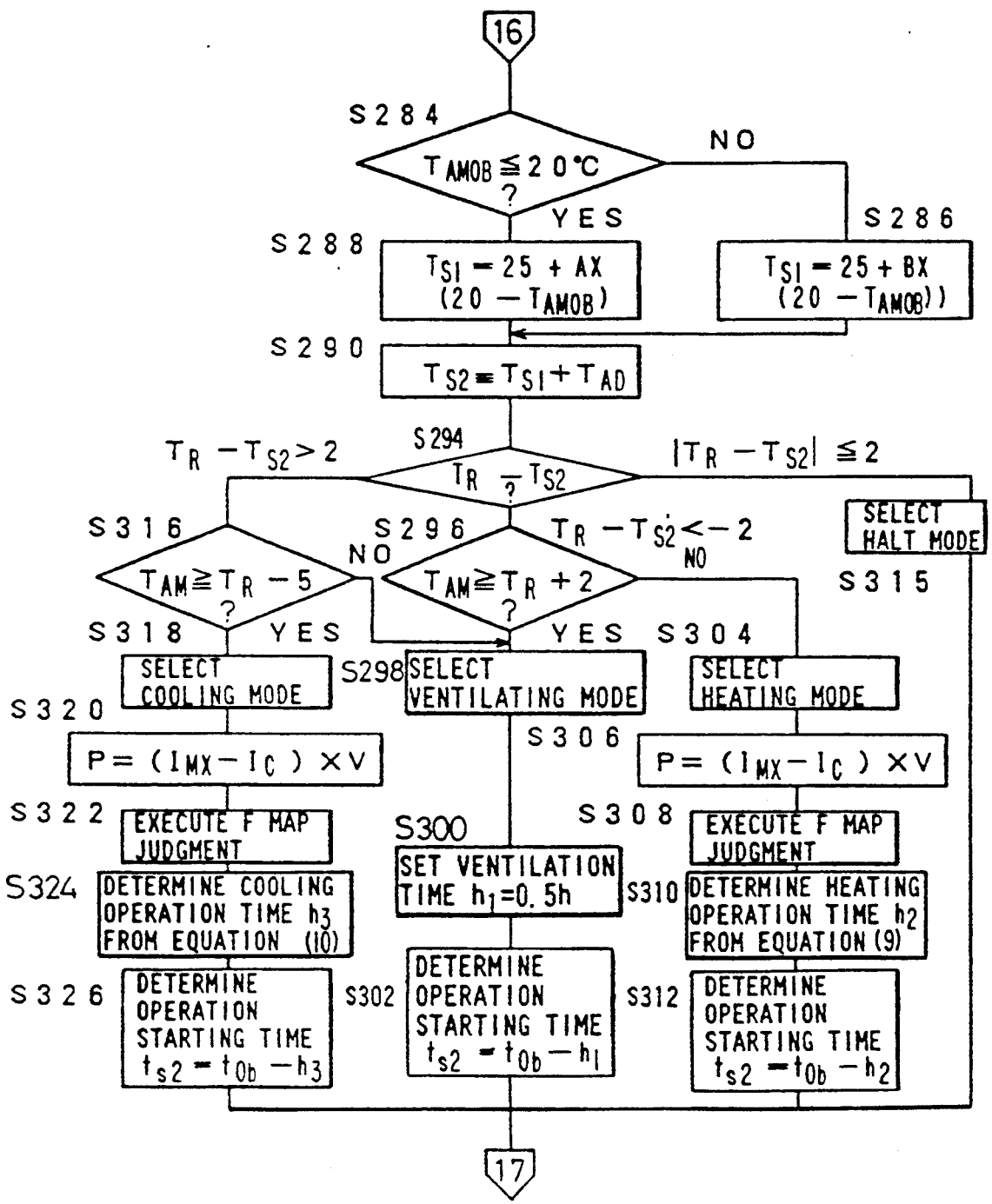
FIG. 23 is a flowchart for describing a further control operation of the embodiment depicted in FIG. 1, which is made under the pre-air-conditioning mode.

It is then determined whether or not the estimated atmospheric temperature $T_{AMOB}$ at the riding expected time $t_{ob}$, which has been computed in Step S280, is less than or equal to 20° C. (i.e., $T_{AMOB} \geq 20°$ C.)(Step S284). As illustrated in FIG. 23, if the answer is determined to be No, then a target temperature $T_{S1}$ is computed in accordance with the following equation (5)(Step S286). If the answer is determined to be Yes, then the target temperature $T_{S1}$ is computed in accordance with the following equation (6) (Step S288).

$$T_{S1} = 25 - A \times (20 + T_{AMOB}) \quad (5)$$

$$T_{S1} = 25 + B \times (20 - T_{AMOB}) \quad (6)$$

Each of the above equations (5) and (6) represents that the room temperature $T_S$ which has initially been set in the factory, is 25° C. A in the equation (5) represents a coefficient at the time of the cooling and B in the equation (6) represents a coefficient at the time of the heating. The relationship between the cooling coefficient A and the heating coefficient B is represented as $A < B$.

Even when the same temperature is set in winter and summer, what the driver feels is unequal in summer and winter. Thus, when the air conditioning for the cooling is made in summer, the room temperature $T_S$ is adjusted so as to be lower than the set temperature 25° C. (see the equation (5)). When, on the other hand, the air conditioning for the heating is effected in winter, the room temperature $T_S$ is adjusted so as to be higher than the set temperature 25° C. (see the equation (6)).

Each target temperature $T_{S1}$ determined as described above when the initially-set room temperature $T_S$ is 25° C., is then corrected based on the value altered in Step S260 (Step S290). This computational expression is represented as the following equation (7):

$$T_{S2} = T_{S1} + T_{AD} \quad (7)$$

where $T_{AD}$ = manually-input temperature value $-25°$ C.

Next, the CPU 62 computes the room temperature $T_R$ and the corrected target temperature $T_{S2}$ (Step S294). A routing processing method is divided according to the result of that computation by the CPU 62.

If the result of the computation is represented as $T_R - T_{S2} > -2°$ C., then the atmospheric temperature $T_{AM}$ which has been read by the atmospheric temperature sensor 60, is compared with the room temperature $T_R + 2°$ C. (Step S296). If $T_{AM} > T_R + 2°$ C., it is then determined that the room temperature $T_R$ can be set to the target temperature $T_{S2}$ by ventilation because the room temperature $T_R$ is lowered 2° C. or more from the corrected target temperature $T_{S2}$ and the atmospheric temperature $T_{AM}$ is higher than the corrected target temperature $T_{S2}$. Thus, the ventilating mode is selected (Step S298). Then, the time $h_1$ for ventilation is set (Step S300) and the time for starting the operation of each of the blower fans 32, 34 is determined from the riding expected time $t_{ob}$ and the ventilation time $h_1$ ($t_s = t_{ob} - h_1$) (Step S302).

If $T_{AM} > T_R + 2°$ C. is not met in Step S296, that is, if both the room temperature $T_R$ and the atmospheric temperature $T_{AM}$ are lower than the target temperature $T_{S2}$, then the heating mode is selected (Step S304).

The power P, which can be used for the heating under the heating mode, is determined from the following equation (Step S306).

$$P = (I_{MX} - I_C) \times V \quad (8)$$

$I_{MX}$ in the equation (8) represents the maximum current which can be supplied by the charger. V shows a battery voltage and $I_C$ represents charge or charging current.

Next, the CPU 62 reads heating capacity F corresponding to the determined usable power P from a data map produced by the usable power P and the heating capacity F which have been stored in the ROM 64 as data in advance (Step S308). Further, the heating operation time $h_2$ required to set the room temperature $T_R$ to the target temperature $T_{S2}$ is determined from the following equation (9) (Step S310).

$$h_2 = \frac{Q \times (T_{ROB} - T_S)}{F - Q1} \quad (9)$$

In the equation (9), Q represents the quantity of heat required to change the room temperature by 1° C. This is a value obtained in advance from an experimental value. Q1 represents the quantity of heat which leaks from the room to the outside of the vehicle.

Next, the time $t_{s2}$ for starting the heating operation is determined from the heating operation time $h_2$ determined by the computation of the equation (9) and the riding expected time $t_{ob}$ ($t_{s2} = t_{ob} - h_2$) (Step S312).

When, on the other hand, it is determined based on the result of the computation in Step S294 that the absolute value of the difference between the room temperature $T_R$ and the target temperature $T_{S2}$ is less than or equal to 2 (i.e., $|T_R - T_{S2}| \leq 2$), it is judged that the room temperature $T_R$ is approximate to the target temperature $T_{S2}$, and a mode for operating the air conditioner is released or halted (Step S315).

Further, when it is determined based on the result of the computation in Step S294 that the difference between the room temperature $T_R$ and the target temperature $T_{S2}$ is more than 2° C. (i.e., $T_R - T_{S2} > 2$), the atmospheric temperature $T_{AM}$ is compared with a room temperature of $T_R - 5$ (Step S316). If $T_{AM} < T_R - 5$, then the ventilating mode in Step S298 is selected and the room temperature $T_R$ is set so as to be equal to the target temperature $T_{S2}$.

If $T_{AM} < T_R - 5$ as a result of the comparison in Step S316, then the cooling mode is selected (Step S318) because the room temperature $T_R$ and the atmospheric temperature $T_{AM}$ are higher than the target temperature $T_{S2}$ ($T_R > T_{S2} < T_{AM}$). Then, the power P usable for the cooling is calculated from the equation (8) for determining the power P usable for the heating (Step S320). Further, cooling capacity F corresponding to the calculated usable power P is read from a data map created by the usable power P and the cooling capacity F which have been stored in the ROM 63 as data in advance (Step S322). In addition, the cooling operation time $h_3$ required to set the room temperature $T_R$ to the target temperature $T_{S2}$ is determined from the following equation (10) (Step S324).

$$h_3 = \frac{Q \times (T_{ROB} - T_S)}{F - Q1 - Q2} \quad (10)$$

In the equation (10), Q2 represents the quantity of solar radiation heat and is used as a factor for reducing a cooling effect. In this case, Q2 is set as a value determined from a measured value according to the kind of vehicle, for example, 800 kcals.

Next, the time $t_{s2}$ for starting the cooling operation is determined from the cooling operation time $h_3$ obtained by the computation of the equation (10) and the riding expected time $t_{ob}$ ($t_{s2} = t_{ob} - h_3$) (Step S326).

Figure 24:
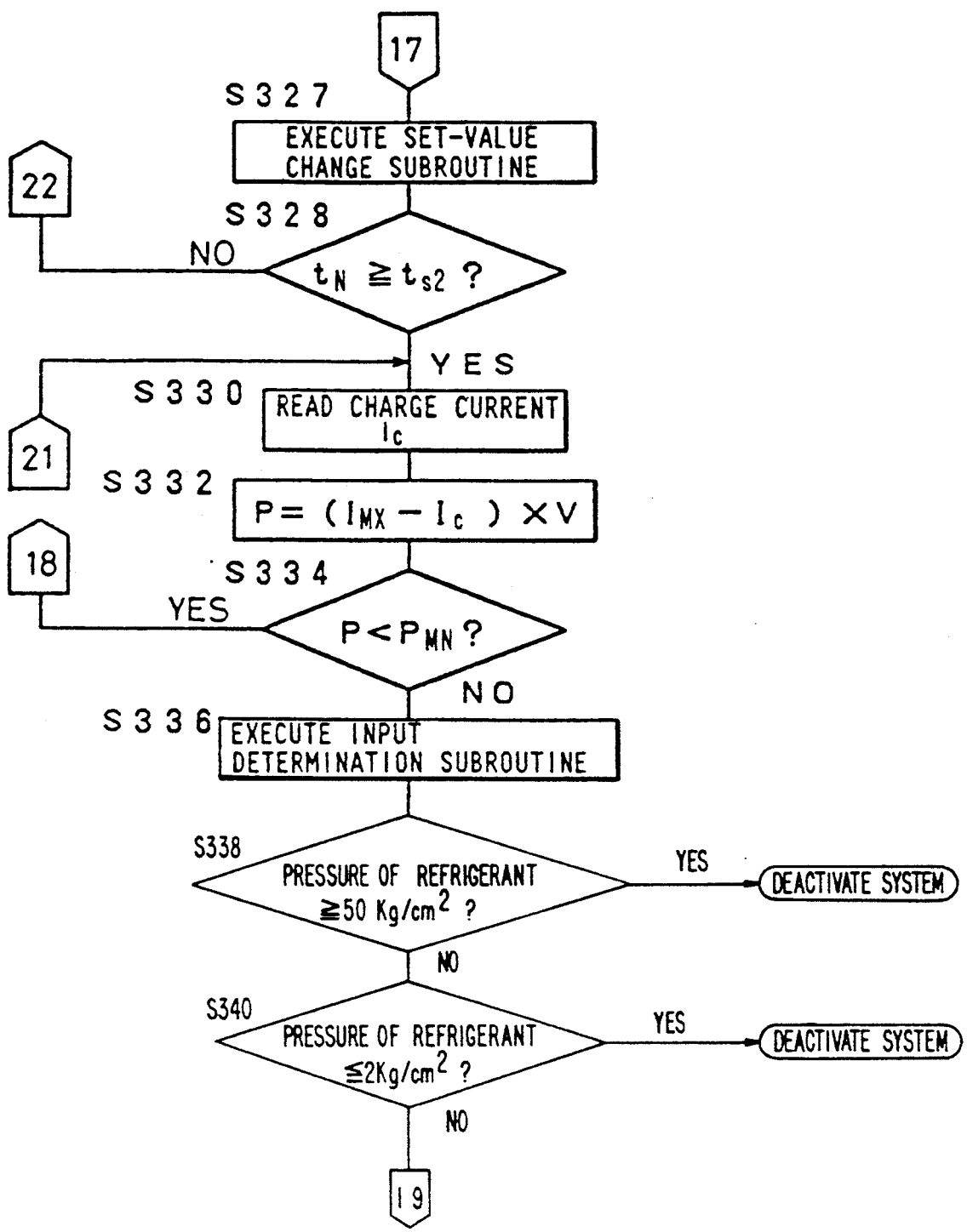
FIG. 24 is a flowchart for describing a still further control operation of the embodiment shown in FIG. 1, which is carried out under the pre-air-conditioning mode.

As described above, Step S302 in which the setting of the operation starting time $t_{s2}$ has been completed under the ventilating mode, Step S312 at the heating mode, and Step S326 at the cooling mode are repeatedly executed from Step S256 until the present time $t_N$ reaches the operation starting time $t_{s2}$ (Step S328 in FIG. 24). When the present time $t_N$ has reached the operation starting time $t_{s2}$, the charging current $I_C$ is read by the charge/discharge current sensor 53 (Step S330). Then, the usable power P is determined from the read charging current $I_C$ in accordance with the equation (8) (Step S332). Further, when the power P usable for the pre-air conditioning system is smaller than the minimum necessary power $P_{MN}$ required to drive the pre-air conditioning system (i.e., $P<P_{MN}$) (Step S334), the pre-air conditioning system is inactivated until the usable power P becomes larger than the minimum necessary power $P_{MN}$ (Step S335).

When the usable power P is larger than the minimum necessary power $P_{MN}$, an input determination subroutine (Step S336) is executed. It is thereafter determined whether or not the pressure of the refrigerant, which has been detected by an unillustrated refrigerant pressure sensor, is more than or equal to 50 kg/cm² (Step S338). If the answer is determined to be Yes, then the air conditioning system is inactivated because the pressure of the refrigerant is unusual or improper. If the answer is determined to be No, it is then determined whether or not the pressure of the refrigerant is less than or equal to 2 kg/cm² (Step S340). If the answer is determined to be Yes in Step S340, then the pressure in the refrigerant is unusually reduced. Thus, the air conditioning system is inactivated in the same manner as when the pressure of the refrigerant is more than or equal to 50 kg/cm². If the answer is determined to be No in Step S340, it is then determined that the refrigerant's pressure is a normal value.

Figure 26:
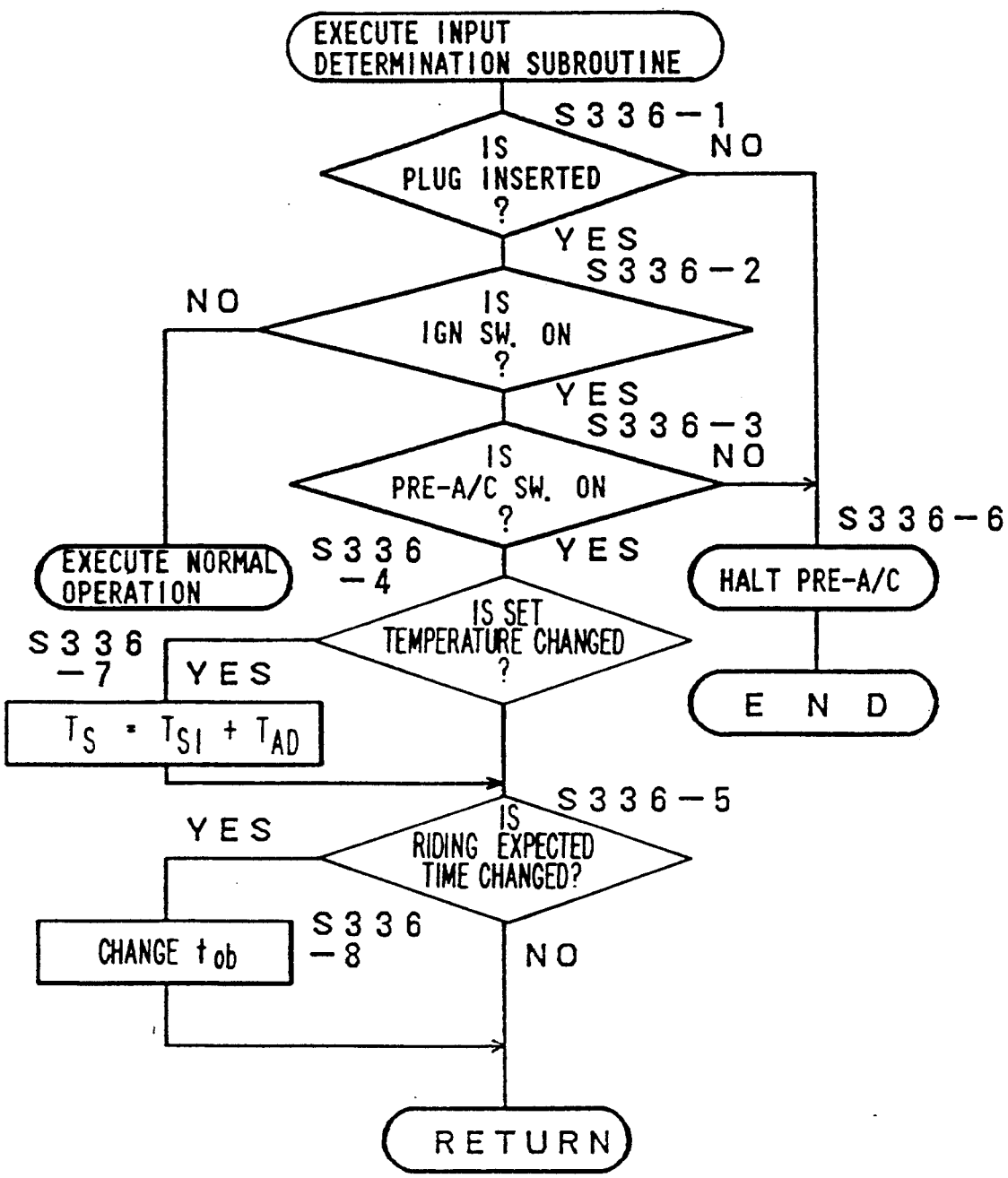
FIG. 26 is a flowchart for describing the operation for control of an input determination subroutine which is executed under the pre-air-conditioning mode shown in FIGS. 21 through 25.
Figure 27:
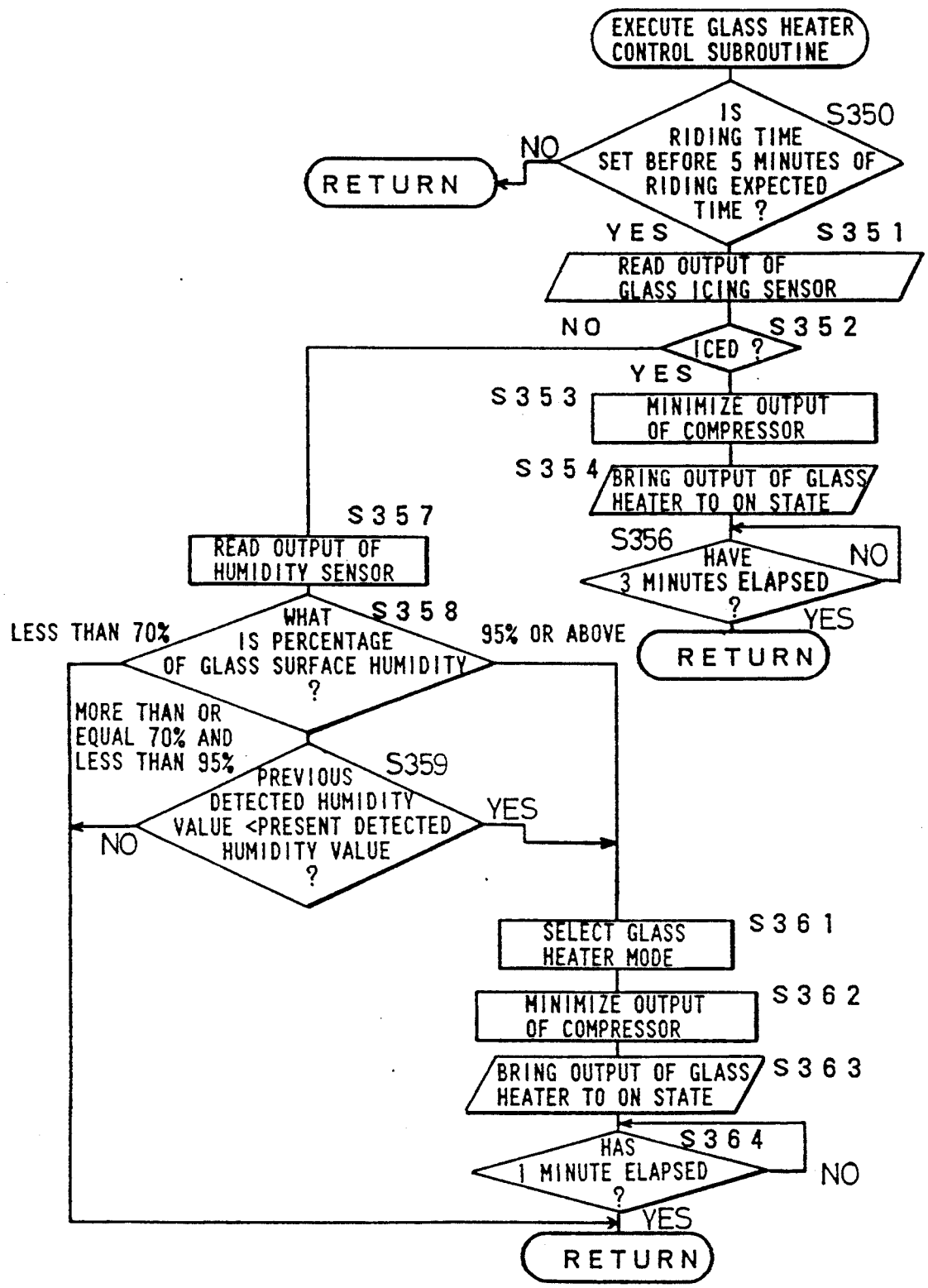
FIG. 27 is a flowchart for describing the operation for control of a glass heater control subroutine which is performed under the pre-air-conditioning mode shown in FIGS. 21 through 25.

A procedure for executing the input determination subroutine in Step S336 will now be described in detail with reference to FIG. 26.

The CPU 62 makes a judgment as to whether or not the charging plug has been inserted (Step S336-1). If the answer is determined to be Yes, it is then determined whether or not the ignition switch is OFF (Step S336-2). If the answer is determined to be Yes, it is then judged whether or not the pre-A/C switch is ON (Step S336-3). If the answer is determined to be Yes, it is then determined whether or not the previously-set room temperature $T_S$ has been changed (Step S336-4). If the answer is determined to be No, it is then judged whether or not a change in the riding expected time $t_{ob}$ has been made (Step S336-5). If the answer is determined to be No, then the routine procedure proceeds to RETURN.

If the answer is determined to be No in Step S336-1 or the answer is determined to be No in Step S336-3, then the operation of the pre-air conditioning system is stopped (Step S336-6). If the answer is determined to be Yes in Step S336-4, then the set value of the room temperature $T_S$ is corrected in accordance with the above equation (7) used in Step S290 (Step S336-7). If the answer is determined to be Yes in Step S336-5, then the set value of the riding expected time $t_{ob}$ is changed (Step S336-8) and the subroutine is completed.

The above-described input determination subroutine (Step S336) is executed so as to repeatedly make the above judgments for each given time interval by using an interrupt technique even after the operation of the air conditioner has been initiated. Therefore, even after the pre-air conditioning system has been operated, a program for processing the set information is executed immediately after instructions such as a change in various settings and a stop of the pre-air con control or the like have been inputted.

Figure 25:
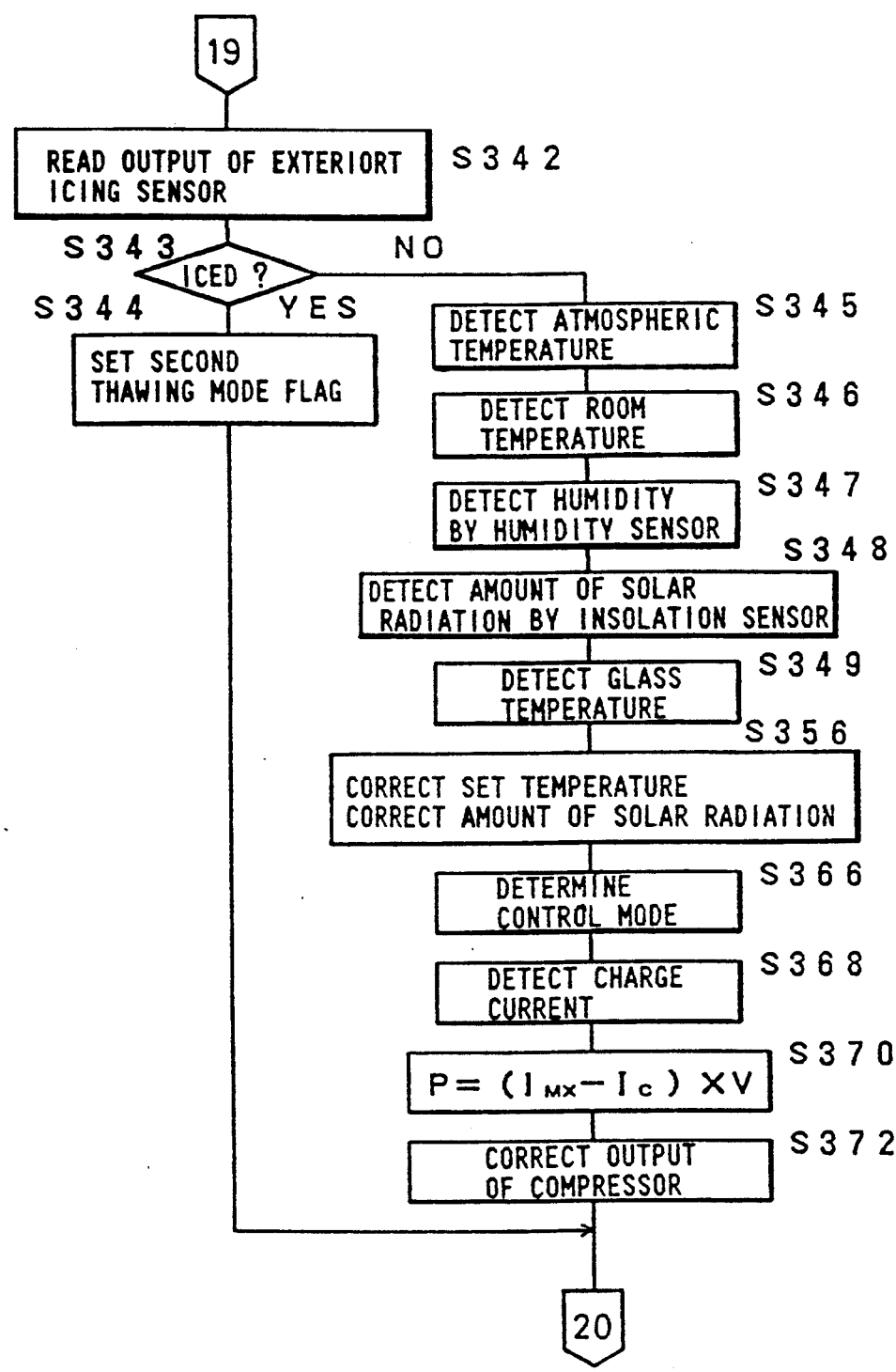
FIG. 25 is a flowchart for describing a still further control operation of the embodiment depicted in FIG. 1, which is performed under the pre-air-conditioning mode.

Next, as illustrated in FIG. 25, the CPU 62 reads the output of the exterior icing sensor 51 attached to the exterior heat exchanger (Step S342). If the exterior heat exchanger is in an iced state (Step S343), then a second thawing mode is selected (Step S344) and the operation for tile second thawing mode, which will be described later, is effected. If the answer is determined to be No in Step S343, then the atmospheric temperature $T_{AM}$ is detected by the atmospheric temperature sensor 60 (Step S345) and the room temperature is read by the room temperature sensor 56 (Step S346). Further, the humidity in the room is detected by the humidity sensor 54 (Step S347).

Further, the amount of solar radiation $S_T$ is detected by the insolation sensor 52 (Step S348). The amount of the solar radiation is corrected based on information about the detected amount $S_T$ in accordance with the following equation (11):

$$T_S = T_S - K_2 \times S_T \tag{11}$$

In the equation (11), $K_2$ represents a constant for correcting the amount of the solar radiation.

Then, information about the icing of the front window glass and/or the rear window glass is read by the glass icing sensor 55 (Step S349).

The control for thawing the iced front window glass and/or the iced rear window glass is effected in accordance with a glass heater control subroutine. This control now will be described in detail with reference to FIG. 27.

More specifically, it is determined whether or not the riding time has been set before five minutes of the riding expected time $t_{ob}$ (Step S350). If the answer is determined to be Yes, then the output of the glass icing sensor 55 is read (Step S351). It is further determined based on the read output whether or not the front window glass and/or the rear window glass is in an iced state (Step S352). If the answer is determined to be Yes, then the output of the compressor 30 of the air conditioner is minimized (Step S353) and the front window and/or rear window glass heater is energized (Step S354).

When three minutes have elapsed after its energization (Step S355), the routine is returned to Step S350.

If the answer is determined to be No in Step S352, then the output of the humidity sensor 54 is read (Step S357). Further, a control method is divided according to the value of humidity on the surface of the front window glass and/or the rear window glass (Step S358).

If the glass surface humidity is more than or equal to 70% and less than 95%, it is then determined whether or not the present value of humidity is larger than the previous value of humidity, which has been read in Step S347 (Step S359). If the answer is determined to be Yes, then a glass heater mode is selected.

If the glass surface humidity which has been read in Step S358, is less than 70% and the answer is determined to be No in Step S359, then the routine is returned to Step S350.

Further, if it is determined in Step S358 that the glass surface humidity is more than or equal to 95%, then the glass heater mode for evaporating water or moisture condensed on the surface of the front window glass and/or the rear window glass is selected (S-tep S361). Then, the output of the compressor 30 of the air conditioner is minimized (Step S362) and the glass heater is energized (Step S363). After one minute has elapsed since its energization, the routine is returned to Step S350.

Next, the air-conditioner control mode determining routine between the above Steps S294 and S326 is executed again (Step S366). Further, any one of a ventilating mode, a first heating mode, a cooling mode and a first dehumidifying mode or a stop or halt mode is selected and the charging current $I_C$ is detected by the charge/discharge current sensor 53 (Step S368). Then, the power P, which can be used in the air conditioner, is determined in accordance with the above equation (8) (Step S370). Thereafter, the output of the compressor 30 is corrected based on the determined usable power P (Step S372).

Figure 28:
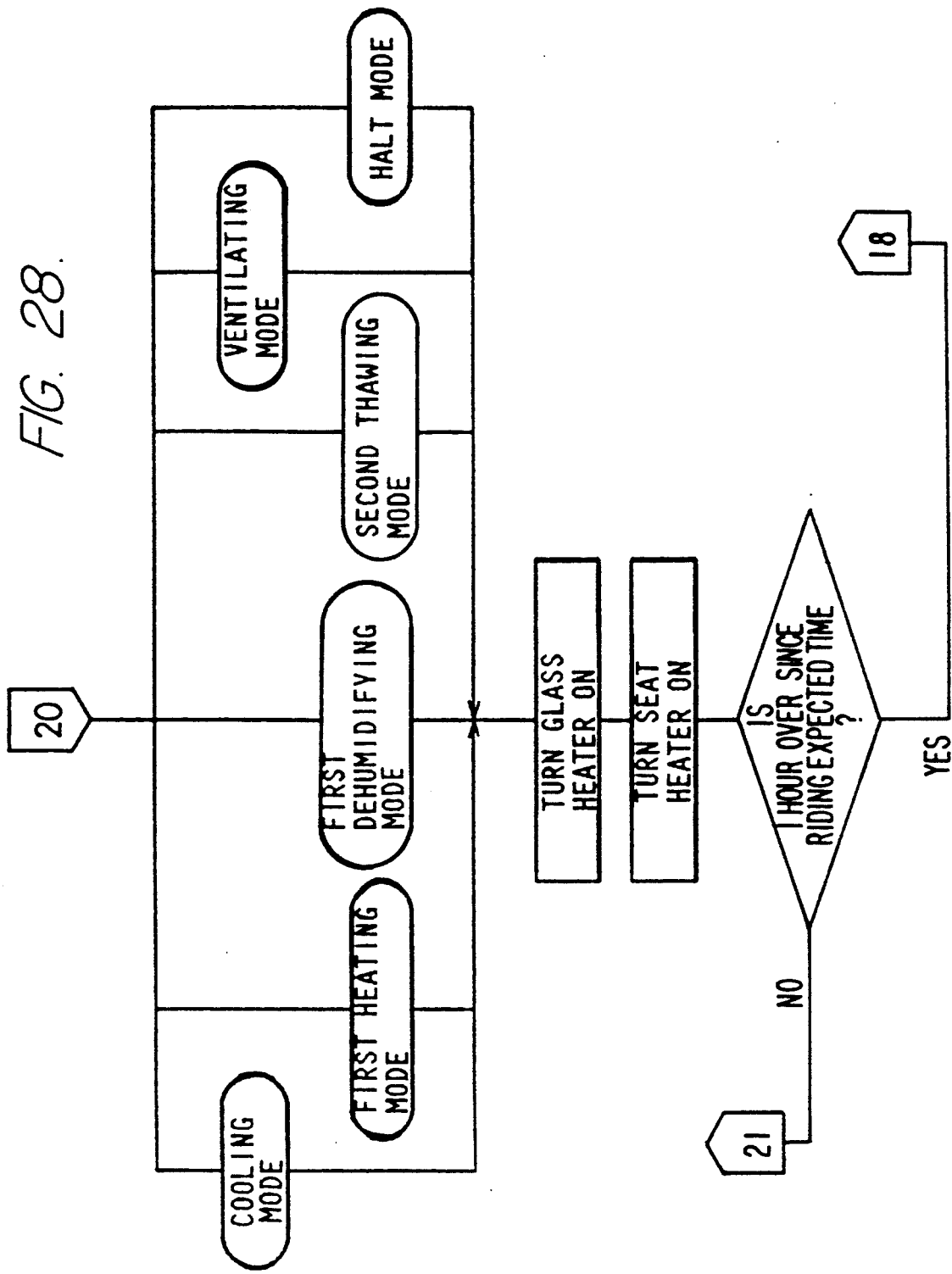
FIG. 28 is a flowchart for describing a still further control operation of the embodiment shown in FIG. 1, which is performed under the pre-air-conditioning mode.

As illustrated in FIG. 28, the CPU 62 executes the operation or action of any one of the above respective modes, which has been selected in accordance with the above Steps, and drives each glass heater and the seat heater as needed. Such control is continuously effected until one hour elapses since the riding expected time $t_{ob}$. After one hour has elapsed since that time, the routine is returned to Step S330.

The control which is effected under each mode, will hereinafter be described by the following examples.

The operation of the air conditioner at the time that any one of a cooling mode, a ventilating mode, a heating mode, dehumidifying modes and thawing modes is selectively used, will now be described with reference to FIGS. 29 through 38.

A description will first be made of the cooling mode.

Figure 30:
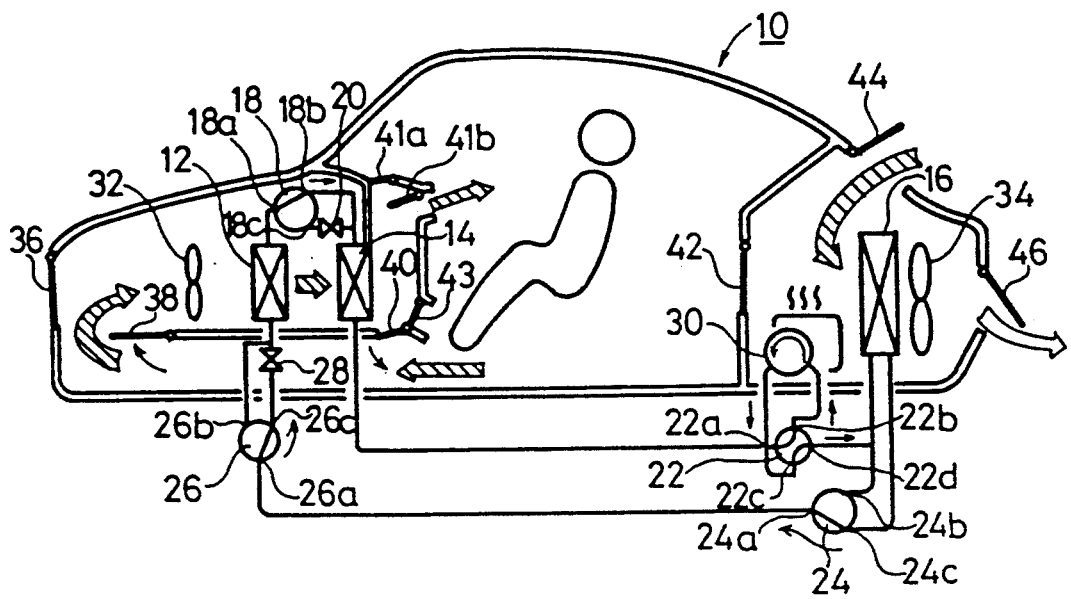
FIG. 30 is a view for describing the operation of the embodiment shown in FIG. 1, which is performed under a cooling mode.

As is easily understood from FIGS. 29 and 30, a first port 22a of the four-way type valve 22 is in communication with a second port 22b thereof under the cooling mode. Further, third and fourth ports 22c, 22d thereof communicate with each other. In the bypass valve 18, a first port 18a and a second port 18b communicate with each other. Thus, the expansion valve 20 connected to a third port 18c of the bypass valve 18 is not operated under the cooling mode.

In the bypass valve 24, a first port 24a is in communication with a third port 24c. The first port 24a of the bypass valve 24 is cut off from communication with a second port 24b thereof. In the bypass valve 26 as well, a first port 26a is in communication with a third port 26c, and the first port 26a and a second port 26b are cut off from being in communication with each other.

A description will now be made of the dampers. As is easily understood from FIG. 30, the damper 38 is in an opened state and the damper 40 is also open. The damper 42 is in a closed state and the dampers 44, 46 are open. Incidentally, the discharge damper 41a is in a closed state and the discharge damper 41b is open. Further, the discharge damper 43 disposed at the driver's feet is in a closed state.

Under the above condition, the interior heat exchanger 14 is operated to control the temperature of air discharged into the room. Further, the interior heat exchanger 12 effects a supporting and dehumidifying function of the interior heat exchanger 14. Thus, each of the interior heat exchangers 14 and 12 changes the air from hot or warm air to cold air. In other words, the air in the room passes through the damper 38 so as to reach the fan 32. Then, the warm air is forced through the interior heat exchanger 12 by the fan 23, followed by transfer to and through the interior heat exchanger 14.

Now, the refrigerant gas whose temperature and pressure are low, which has passed through the expansion valve 28, is subjected to heat exchange by the interior heat exchangers 12, 14. Thus, tile cold air is supplied to the driver from tile discharge damper 41b. The refrigerant gas whose pressure is low and whose temperature is higher, which has passed through the interior heat exchanger 14, first moves from the first port 22a of the four-way type valve 22 to the second port 22b thereof and is then increased in pressure and temperature by the compressor 30. Then, the so-processed gas passes through the third and fourth ports 22c, 22d of the four-way type valve 22 so as to reach tile exterior heat exchanger 16. Since the damper 44 is now open, the outside air is introduced into the room. The gas whose pressure is high and whose temperature is high and the outside air is forced through the exterior heat exchanger 16 under the action of the fan 34 are subjected to heat exchange by the exterior heat exchanger 16. Thereafter, the gas, which has been increased in pressure and lowered in temperature, is introduced into the first port 24a from the third port 24c of the bypass valve 24 so as to reach the bypass valve 26.

Since the first port 26a of the bypass valve 26 and the third port 26c thereof are in communication with each other under the cooling mode, the gas, which has been increased in pressure and decreased in temperature, reaches the expansion valve 28 where it is decreased in pressure and temperature, after which the gas is introduced into the interior heat exchanger 14 from the interior heat exchanger 12. This cycle is repeated. In this case, the cooling mode normally remains unaltered when either the air con control or the pre-air con control are effected. That is, only the cooling mode is used in this case.

Figure 31:
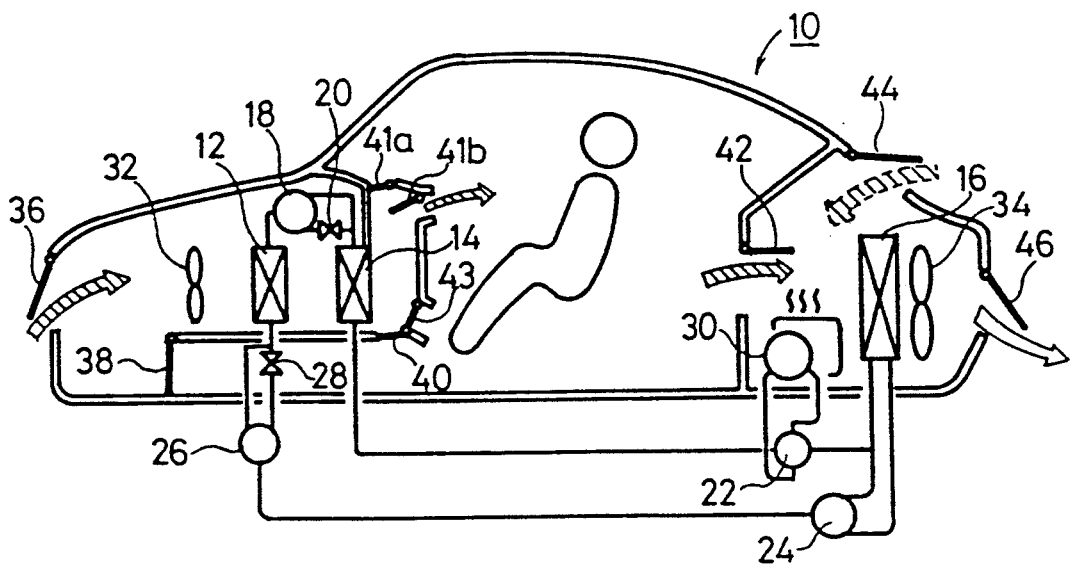
FIG. 31 is a view for describing the operation of the embodiment depicted in FIG. 1, which is made under a ventilating mode.

A description will now be made of the ventilating mode with reference to FIGS. 29 and 31.

The ventilating mode is used to ventilate the room of the electric vehicle 10 by introducing the outside air therein. Therefore, the interior heat exchangers 12, 14 and the exterior heat exchanger 16 are in an OFF state. However, the fan 32 is in an operated state to forcedly introduce the outside air into the room of the electric vehicle 10. The damper 36 is opened and the damper 38 is closed. Further, the discharge damper 41b is opened and the damper 40 is also in an opened state. Furthermore, the damper 42 is opened and the damper 46 is also opened. Here, the damper 44 is opened as needed and the outside air may be forceably introduced into the room from the rear of the electric vehicle 10. At this time, the fan 34 can also be operated so as to discharge the air in the room of the electric vehicle 10 to the outside. It can be easily understood from FIG. 31 that each of the remaining dampers is in a closed state.

The opening of the damper 42 is made only when the room of the electric vehicle 10 is ventilated. However, the opening of the damper 44 is applied even to a case in which air for cooling is introduced into the compartment containing the electric motor M from the outside when the cooling air otherwise produced for the electric motor is insufficient. The ventilating mode is normally used when either the air con control or the pre-air con control is effected.

Figure 32:
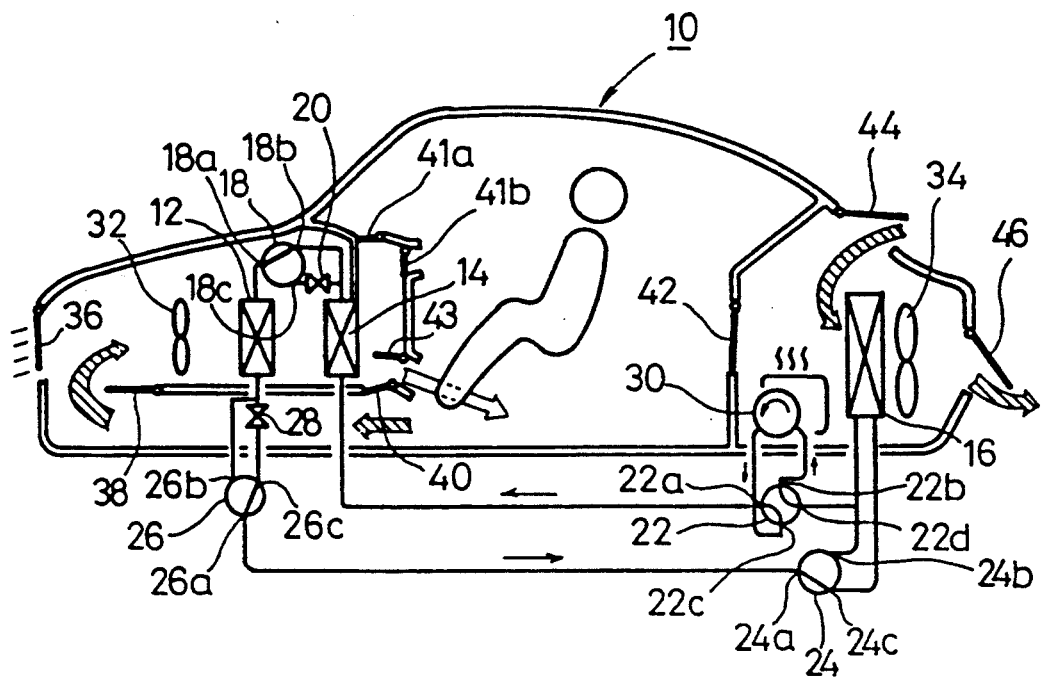
FIG. 32 is a view for describing the operation of the embodiment illustrated in FIG. 1, which is carried out under a heating mode.

The heating mode will next be described below with reference to FIGS. 29, 32 and 33.

The heating mode is used to heat the air in the room with or without introducing tile outside air into the room of the electric vehicle 10. The first port 22a of the four-way type valve 22 and the third port 22c thereof are in communication with each other. The second port 22b of tile four-way type valve 22 and the fourth port 22d thereof are also in communication. Further, the first port 24a of the bypass valve 24 is in communication with the third port 24c thereof. In the bypass valve 26, the first port 26a and the third port 26c are in communication with each other. Further, the first port 18a of the bypass valve 18 is in communication with the second port 18b thereof.

A description will now be made of the respective dampers. Referring to FIG. 32, the damper 38 is opened and the discharge dampers 41a, 41b are closed. The discharge damper 43 is opened and the damper 40 is also in an opened state. Further, the damper 42 is closed and each of the dampers 44, 46 is in an opened state. Each of the fans 32, 34 is in an operated state and each of the interior heat exchangers 12, 14 is activated to serves to change cold air to warm air. Further, the exterior heat exchanger 16 cools the air passing therethrough for absorbing heat from the air.

The operation of each of the interior heat exchangers 12, 14 and the exterior heat exchanger 16 will now be described with reference to FIGS. 29 and 32.

The second port 24b of the bypass valve 24 and the fourth port 24d thereof are in communication with each other. Therefore, refrigerant gas whose temperature and pressure are low is drawn through the exterior heat exchanger 16 by the compressor 30. Now, the outside air introduced from the opened damper 44 is subjected to heat exchange by the exterior heat exchanger 16 and hence the gas whose temperature is high and whose pressure is low, is introduced into the compressor 30. That is, the gas, which is high in temperature and low in pressure, flows into the second port 22b of the four-way type valve 22 from the fourth port 22d thereof. Further, the refrigerant gas flows through and is compressed by the compressor 30 and then moves from the third port 22c of the four-way type valve 22 to the first port 22a thereof through and flows into the interior heat exchanger 14. The high pressure and high temperature gas fed from the compressor 30 is subjected to heat exchange by the interior heat exchanger 14 so as to be brought into high pressure and low temperature gas. Further, the so-processed gas flows into the first port 18a of the bypass valve 28 from the second port 18b thereof. Then, the gas passes through the interior heat exchanger 12 so as to be brought into a low-temperature and high-pressure state, after which it flows into the expansion valve 28. Thereafter, the gas, which has been reduced in temperature and pressure by the expansion valve 28, flows into the first port 26a of the bypass valve 26 from the third port 26c thereof and is introduced into the exterior heat exchanger 16 again. Accordingly, the warm air is supplied to the driver's feet as indicated by the arrow.

Figure 33:
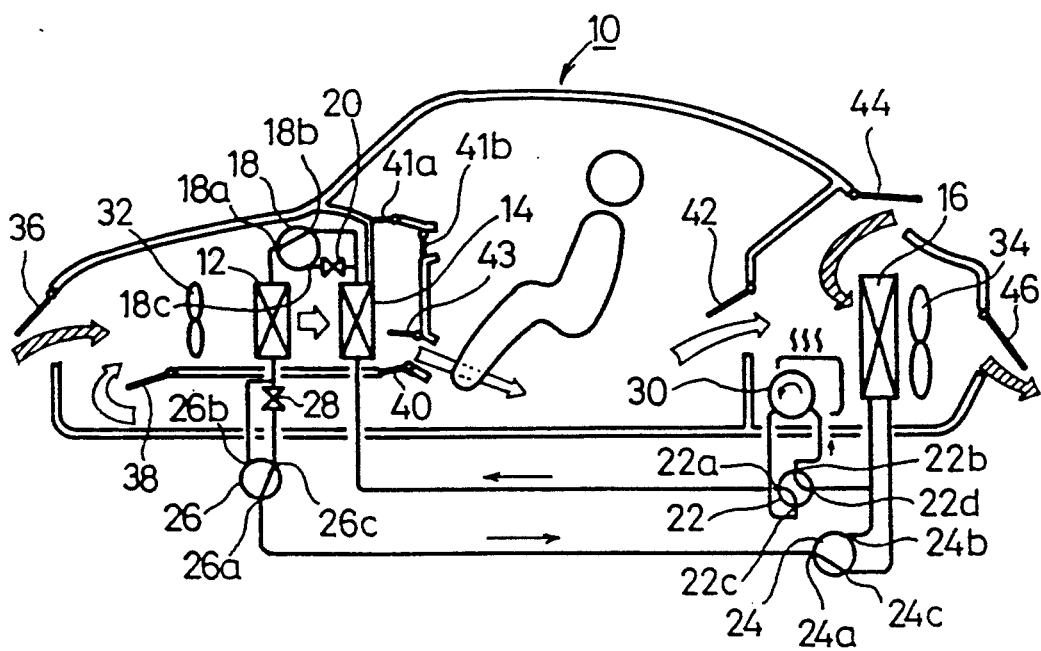
FIG. 33 is a view for describing the operation of the embodiment shown in FIG. 1, which is effected under the heating mode.

FIG. 33 shows a case in which the outside air introducing changeover switch of the inside/outside air changeover switches 76e is selected under the heating mode. In this case, the damper 36 is opened so as to introduce the outside air into the room of the electric vehicle 10, and the damper 42 is in an opened state. The damper 38 is in a half-opened state. The remaining dampers serve in a manner similar to those described under the above heating mode. The outside air changeover switch selected under the heating mode can provide a superb switching function or operation for introducing the outside air into the room of the electric vehicle 10. Further, so long as the damper 38 is half-opened as illustrated in FIG. 33, a further improvement in the ventilation of the room can be suitably made by letting the outside air therein but not discharging all the warm air from the vehicle room to the outside.

A description will now be made of the dehumidifying modes. Each of the dehumidifying modes is used reduce the humidity of the room of the electric vehicle 10. As the dehumidifying modes, there are known one used to dehumidify only the inside of the electric vehicle 10 and another one used to introduce part of the outside air into the inside of the electric vehicle 10 and dehumidify the inside thereof.

Figure 34:
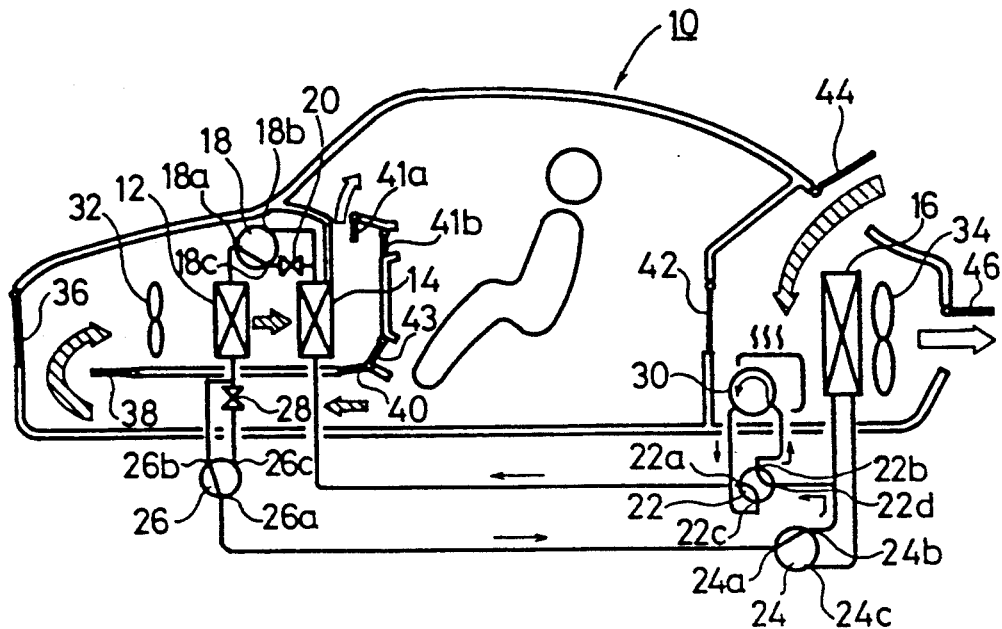
FIG. 34 is a view for describing the operation of the embodiment shown in FIG. 1, which is made under a first dehumidifying mode.

A description will first be made of a first dehumidifying mode with reference to FIGS. 29 and 34. The interior heat exchanger 14 serves to change cold air to warm air and the interior heat exchanger 12 serves to change warm air to cold air. In the bypass valve 18 interposed between the interior heat exchangers 12 and 14, the first port 18a of the bypass valve 18 communicates with the third port 18c thereof. The first port 26a of the bypass valve 26 is in communication with the second port 26b thereof. Further, the first port 24a of the bypass valve 24 is in communication with the second port 24b thereof. In the four-way type valve 22, the first port 22a communicates with the third port 22c. Further, the second port 22b of the four-way type valve 22 is in communication with the fourth port 22d thereof. The fan 32 is in an operated state and the fan 34 is also in an activated state.

A description will next be made of the dampers. The damper 36 is closed and the damper 38 is opened. The discharge damper 41a is opened whereas the discharge damper 41b is closed. Further, the discharge damper 43 is closed and the damper 40 is open. Furthermore, the damper 42 is in a closed state and each of the dampers 44, 46 is in an opened state.

The above damper arrangement is made to maintain dehumidifying ability at a middle level and to reduce heating ability. The heat discharged from the electric motor is exposed to the outside air by opening the dampers 44, 46.

With the above arrangement, the high temperature and high pressure refrigerant gas is produced from the compressor 30. The so-produced gas flows into the first port 22a of the four-way type valve 22 from the third port 22c thereof and is then introduced into the interior heat exchanger 14. At this time, the cold air delivered from the interior heat exchanger 12 is subjected to heat exchange in the interior heat exchanger 14. The so-processed air is introduced into the room from the discharge damper 41a as warm air.

This low temperature and high pressure gas, which has been subjected to the heat exchange, is introduced into the expansion valve 20 where it is changed to a low temperature and low pressure gas. This gas is introduced into the interior heat exchanger 12. Since tile high temperature air of the room is supplied to the interior heat exchanger 12 under the action of the fan 32, the gas is changed to a low pressure and high temperature gas. The resultant gas flows into the first port 26a of the bypass valve 26 from the second port 26b thereof and is then introduced into the bypass valve 24.

In the bypass valve 24, the first port 24a and the second port 24b are in communication. Since, on the other hand, the third port 24c of the bypass valve 24 is in a closed state, the gas referred to above flows into the four-way type valve 22 rather than exterior heat exchanger 16. Further, the gas flows into the second port 22b of the four-way type valve 22 and from the fourth port 22d thereof so as to reach the compressor 30. The gas is subjected to a high temperature and high pressure process by the compressor 30, and the so-processed gas flows into the interior heat exchanger 14 again.

As is apparent from the above description, the interior heat exchanger 14 supplies and converts the cold air to the room as warm air under the first dehumidifying mode. On the other hand, the interior heat exchanger 12 supplies and converts the warm air to the interior heat exchanger 14 as cold air and causes condensation of water from the air. It is therefore possible to dehumidify the room and heat the same at a relatively low temperature. The electric motor for driving the compressor 30 is cooled by the outside air by the opening of the damper 44. The warm air produced by the electric motor is discharged to the outside from the damper 46 under the action of the fan 34.

Figure 35:
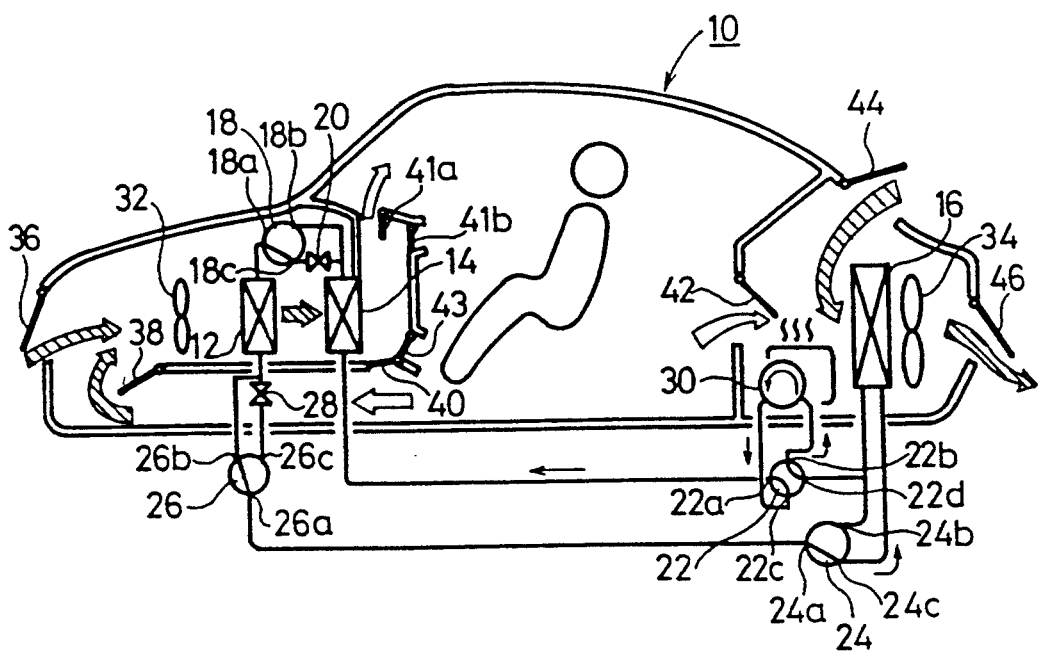
FIG. 35 is a view for describing the operation of the embodiment depicted in FIG. 1, which is performed under a second dehumidifying mode.

A description will next be made of a second dehumidifying mode. The second dehumidifying mode is used to provide dehumidifying ability superior to that in the first dehumidifying mode and to increase heating ability to a range of from a lower level to a middle level. As is easily understood from FIG. 35, the bypass valve 24 is therefore switched to cause the first port 24a thereof to communicate with the third port 24c thereof with the second port 24b thereof held in a closed state. Accordingly, the high temperature and low pressure gas supplied from the expansion valve interior heat exchanger 12 through by pass valve 26 is introduced into the exterior heat exchanger 16. In this case, FIG. 35 is different in damper structure from FIG. 34 in that the damper 36 is opened, the degree of opening of the damper 38 is smaller than that of the damper 38 shown in FIG. 34 and the damper 42 is in an opened state.

As a result, the introduction of the outside air into the vehicle room by the damper 36 rather than the circulation of air in the room is effected. The air in the room is supplied to the exterior heat exchanger 16 by the opening of the damper 42. That is, the exterior heat exchanger 16 absorbs the heat of the dehumidified warm air which is delivered from the room and has a temperature range from a middle temperature to a low temperature, and discharges the so-processed air into the outside through the damper 46.

Figure 36:
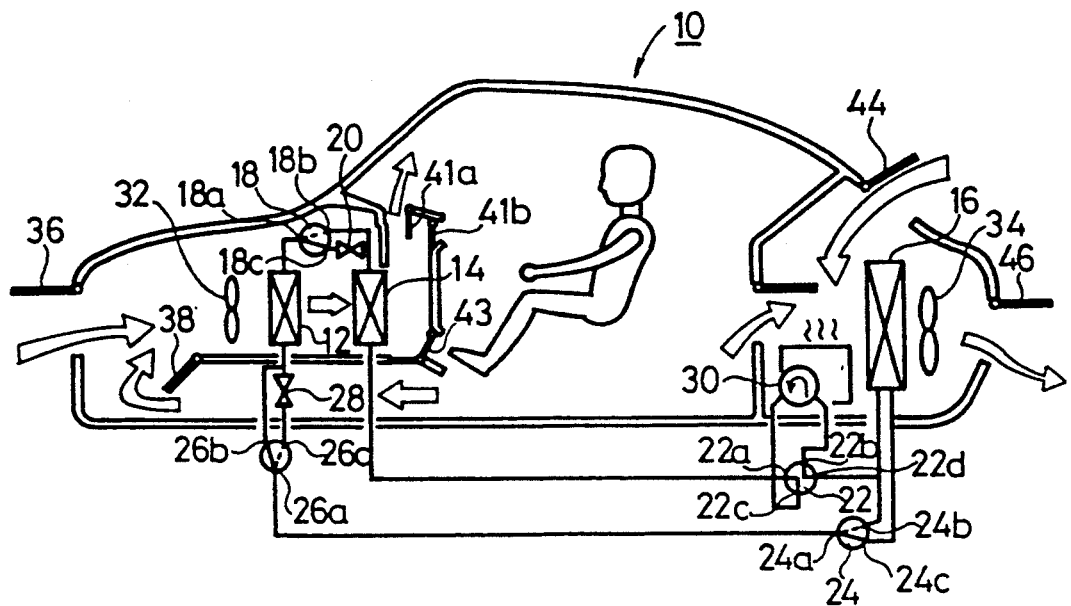
FIG. 36 is a view for describing the operation of the embodiment shown in FIG. 1, which is carried out under a third dehumidifying mode.

Further, when the outside air introducing change-over switch of the inside/outside air changeover switches 76e is manually selected, the outside air is introduced and dehumidified. In this case, the modified second dehumidifying mode differs from the above-described dehumidifying mode in that the dampers 36 and 42 are in a fully-open state and the dampers 44, 46 are opened as illustrated in FIG. 36. Thus, the efficiency of introduction of the outside air into the room can be further improved and an improvement in the dehumidifying ability can be effected. Further, the heating ability can be reduced to a low level.

A final description will now be made of the thawing modes. In low ambient temperature conditions, when the system is operated in a heating mode the exterior heat exchanger 16 may accumulate frost and ice that prevents air circulation therethrough for proper operation. The thawing modes comprise a first thawing mode and a second thawing mode. Under the first thawing mode, the gas circulates so as to pass through the interior heat exchangers 12, 14 without passing through the expansion valve 28. Accordingly, for example, ice or the like formed on the exterior heat exchanger 16 can be removed while the warm air is being fed into the room. Under the second thawing mode, a further improvement in thawing ability can be achieved and the warm air is not introduced into the room.

Figure 37:
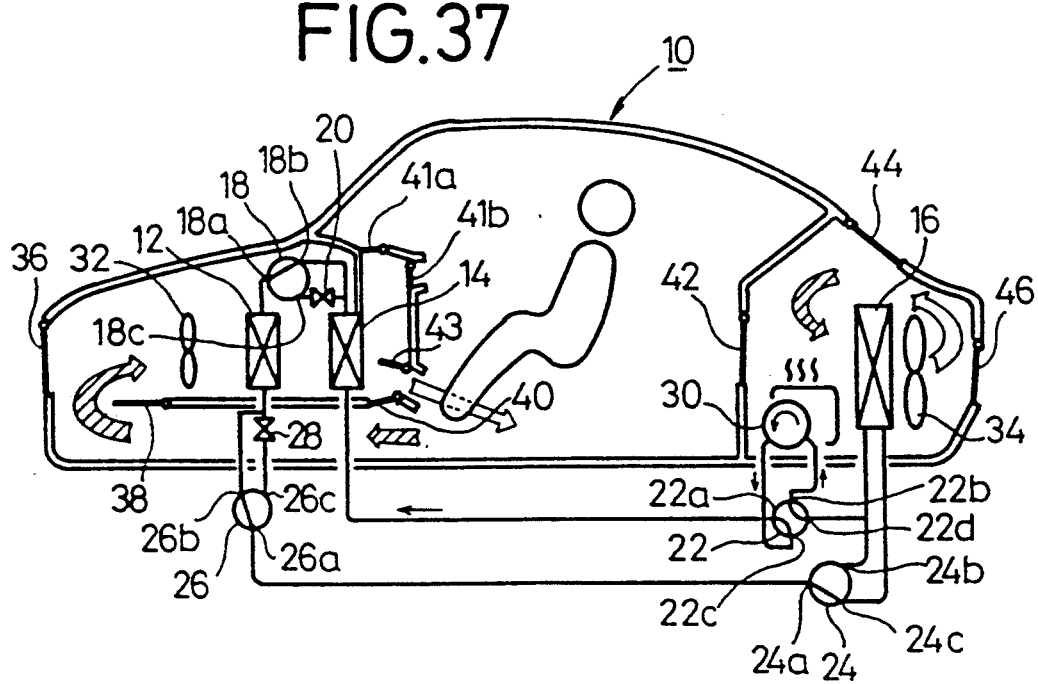
FIG. 37 is a view for describing the operation of the embodiment illustrated in FIG. 1, which is performed under a first thawing mode.

A description will first be made of the first thawing mode with reference to FIGS. 29 and 37. In this case, each of the interior heat exchangers 12, 14 serves to change cold air over to warm air. The exterior heat exchanger 16 also serves to change cold air to warm air. A description will now be made of the dampers. The damper 36 is closed and each of the discharge dampers 41a, 41b is also in a closed state. Further, the discharge damper 43 is opened and each of the dampers 38, 40 is in a fully-open state. The damper 42 is closed and each of the dampers 44, 46 is also in a closed state. The first port 22a of the four-way type valve 22 and the third port 22c thereof are in communication with each other, whereas the second port 22b of the four-way type valve 22 and the fourth port 22d thereof are in communication with each other. In the bypass valve 24, the first port 24a communicates with the third port 24c. In the bypass valve 18 as well, the first port 18a and the second port 18b are in communication with each other. Further, the first port 26a of the bypass valve 26 is in communication with the second port 26b thereof and the fan 32 is in an operated state. Similarly, the fan 34 is also in operation.

With the above arrangement, the high temperature and high pressure gas produced from the compressor 30 is first introduced into the interior heat exchanger 14 under the first thawing mode. At this time, the interior heat exchanger 14 serves to make a further increase in the temperature of the warm air which has been produced by the heat exchange of the interior heat exchanger 12. The so-heated air is supplied to the driver's feet.

On the other hand, the high temperature and high pressure gas then passes through the interior heat exchanger 12 and flows into the bypass valve 26 without passing through the expansion valve 28. Since the second port 26b and the first port 26a are in communication with each other, the gas further passes through the bypass valve 24 and moves via the third port 24c from the first port 24a to-the exterior heat exchanger 16, where it is subjected to heat exchange. The gas remains in medium-temperature and high-pressure state when it reaches the exterior heat exchanger 16. Thus, the gas is subjected to the heat exchange by the exterior heat exchanger 16 so as to heat the air. Also, the heat from the electric motor M may be added to the compartment containing exterior heat exchanger 16. As a result, ice formed on the surface of the exterior heat exchanger 16 is thawed by the heated air circulated by fan 36.

Figure 38:
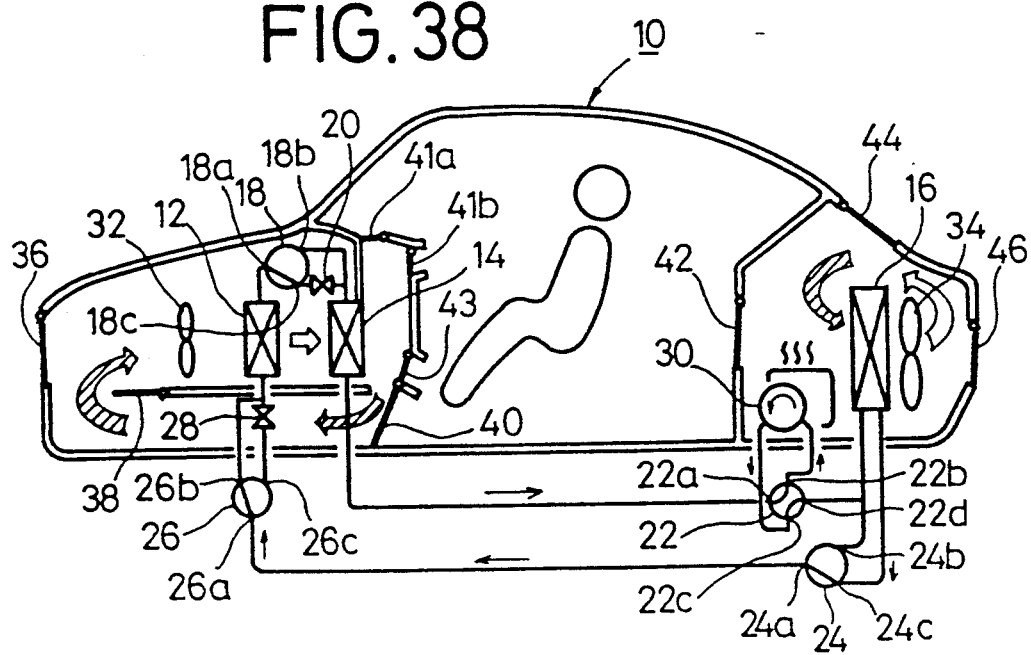
FIG. 38 is a view for describing the operation of the embodiment shown in FIG. 1, which is made under a second thawing mode.

The second thawing mode will now be described with reference to FIGS. 29 and 38. In this case, the second thawing mode differs from the first thawing mode in that the damper 40 is in a fully-closed state and the gas flow shown in FIG. 38 is directly opposite to that shown in FIG. 37. Further, the interior heat exchanger 14 serves to change warm air to cold air, whereas the interior heat exchanger 12 plays the role of a changing cold air to warm air. Furthermore, the first port 18a of the bypass valve 18 and the third port 18c thereof communicate with each other so as to operate the expansion valve 20. In the four-way type valve 22, the first port 22a and the second port 22b are in communication with each other. In addition, the third port 22c of the four-way type valve 22 is in communication with the fourth port 22d thereof.

Thus, the gas, which has been increased in temperature and pressure by the compressor 30 first flows into the fourth port 22d of the four-way type valve 22 from the third port 22c thereof and then reaches the exterior heat exchanger 16. In the exterior heat exchanger 16, the gas is cooled by the cold air and ice formed on the exterior heat exchanger 16 and then flows to the bypass valve 24 as the high pressure and low temperature gas. Further, the gas flows into the bypass valve 26 from the bypass valve 24 so as to reach the interior heat exchanger 12. The gas is subjected to heat exchange by the exterior heat exchanger 16 so as to change the ambient air thereof from cold air to warm air. Therefore, ice or the like formed on the surface of the exterior heat exchanger 16 can be thawed.

The gas, which has passed through the bypass valve 26, is introduced into the interior heat exchanger 12. Since the cold air is forcedly supplied to the interior heat exchanger 12 under the action of the fan 32, the high pressure and low temperature gas is further reduced in temperature in the interior heat exchanger 12. On the other hand, the air, which has passed through the interior heat exchanger 12 and heated to warm air, reaches the interior heat exchanger 14. Now, the high pressure and low temperature gas, which has been produced from the interior heat exchanger 12, passes through the expansion valve 20 so as to flow into the interior heat exchanger 14, where the warm air is changed over to cold air. Further, the high temperature and low pressure gas is fed to the compressor 30 again through the four-way type valve 22.

The cooling, ventilating, heating, dehumidifying and thawing modes have become apparent from the above detailed description.

While the invention has been described with particular reference to a refrigerant has heat pump type system employing three heat exchangers, it will readily appear to those skilled in the art that more or fewer heat exchangers may be used and the heat exchangers may be located in various compartments and spaces in the vehicle. Moreover, other devices may be used to supplement or replace portions or functions of the system, such as, additional electric heating elements on portions of the vehicle contacted or close to the driver for preheating same or a fuel-burning heater for use in extreme cold weather conditions.

According to the present embodiment, as has been described above in connection with FIG. 16, when the pre-A/C switch of the electric vehicle is actuated while the vehicle is stopped at night, for example, (Step S160) and the charger is connected (Step S162), the door/window confirmation subroutine (Step S163) is executed.

In the door/window confirmation subroutine, it is determined whether or not either a door or a window is in an opened state. If the answer is determined to be Yes, then its opened state is displayed as a message and the alarm is sounded so as to inform the driver of information about the fact that either a door or a window is open. When either the door or the window is not closed within a predetermined time interval, for example, 3 minutes, the alarm is stopped from sounding and the air conditioner is deactivated until either the door or the window is closed.

Thus, when either the door or the window is in the opened state, the pre-air conditioning operation is not initiated. Therefore, the power required to charge the battery which serves as the running drive source of the vehicle, is no longer wasted by an inefficient pre-air conditioning process.

Figure 6:
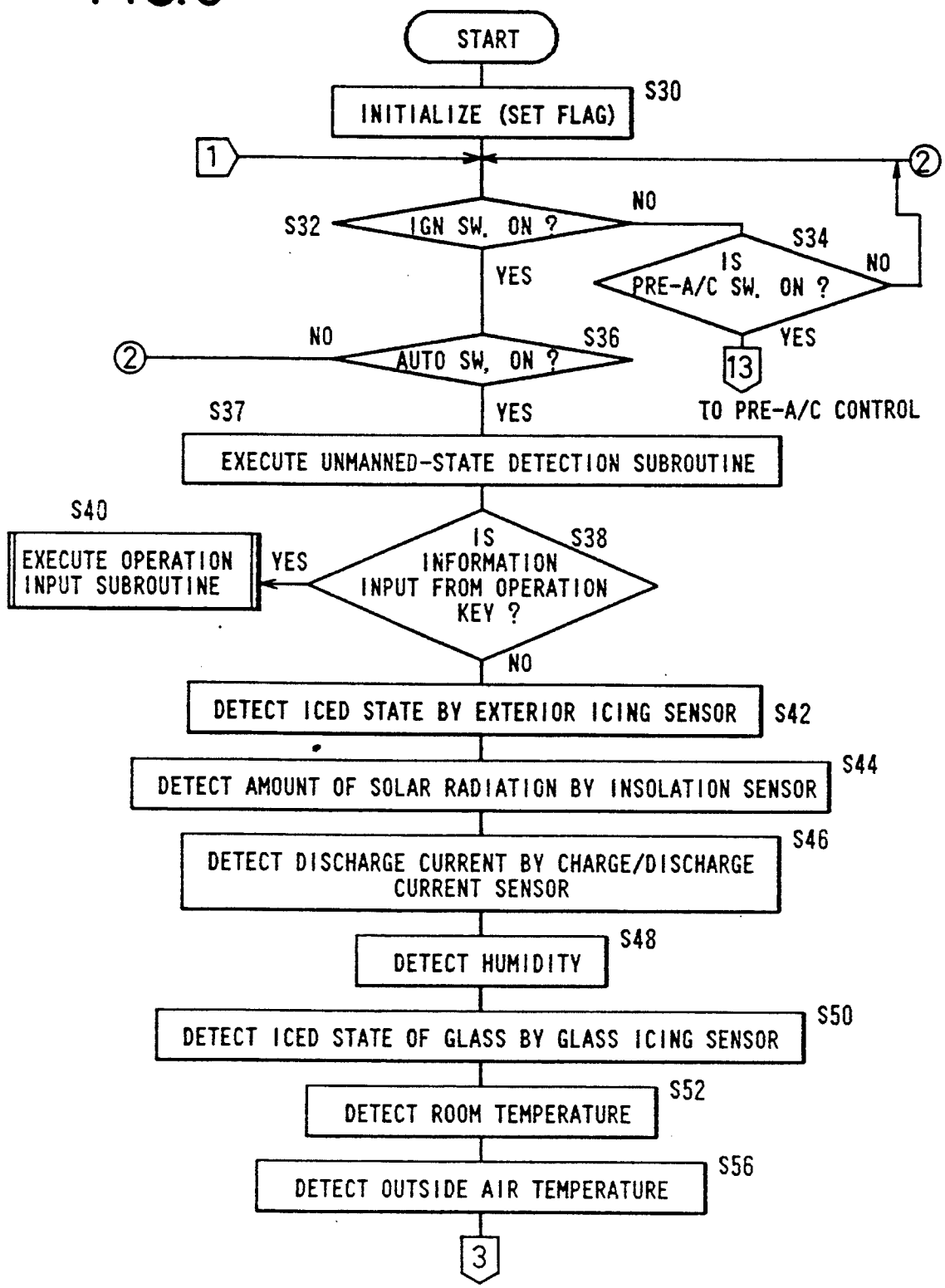
FIG. 6 is a flowchart for describing a control operation of the embodiment depicted in FIG. 1, which is executed under the normal air-conditioning mode.

When, on the other hand, as shown in FIG. 6, the AUTO switch for activating the air conditioner of the vehicle is actuated in a normally-driven state (Step S36), it is determined in the unmanned-state detection subroutine (Step S37) whether or not either the door or the window is in the opened state (Step S37-1 and Step S37-2 in FIG. 8). If it is determined that either the door or the window is continuously open only during the given time interval (Step S37-13 through Step S37-15), then the message indicative of the fact that either the door or the window is in the opened state is displayed on the liquid crystal display panel 76a (Step S37-16) and the alarm is sounded (Step S37-17) so as to inform the driver or the like of information about the fact that either the door or the window is open.

Next, the seat pressure sensitive sensor 61 detects whether or not the vehicle room is the unmanned state (Step S37-4). When the air conditioner is activated over a long period of time in spite of the unmanned state (Step S37-6), the message indicative of the fact that the vehicle is in the unmanned state is displayed on the liquid crystal display panel 76a (Step S37-7) and the alarm is sounded (Step S37-8). When the vehicle remains unmanned even if the time interval required to continuously sound the alarm has elapsed, the air conditioner is deactivated so as to halt or deactivate the air conditioning system.

Thus, the air conditioner can be effectively driven in the normally-driven state.

In the air conditioning system according to the present invention, which is suitable for use in the electric vehicle, it is possible to prevent the driver from leaving either the door or the window open during the execution of the pre-air conditioning control for air-conditioning the vehicle room when the vehicle is at a stop. It is also possible to prevent the pre-air conditioning control system from being operated when either the door or the window is open.

It is therefore possible to prevent external power for the common use of charging of the battery from being wasted by pre-air conditioning the room in the opened state of either the door or the window. Further, the power required to charge the battery used as the running drive source of the electric vehicle can be sufficiently maintained.

In the electric vehicle which is in the normally-driven state, when either the door or the window is opened during the operation of the air conditioner, the driver or the like is informed of such an opened state. When the vehicle room is in the unmanned state for a long period of time, the air conditioner can be inactivated. It is therefore possible to efficiently air-condition the room and to prevent the power required to drive the air conditioner from being wasted.

Having now fully described the invention, it will be apparent to those skilled in the art that many changes and modifications can be made without departing from the spirit or scope of the invention as set forth herein.

What is claimed is:

1. An air conditioning system for use in an electric vehicle having an air conditioner for air-conditioning the room of said vehicle, comprising:

an environment sensor for detecting the state of an environment in the vehicle room;

warning means; and controlling means for operating an air-conditioning switch so as to read the output of said environment sensor, activating said warning means for a predetermined time interval only when said environment sensor produces an output indicative of an improper state of environment in the vehicle room, and deactivating the air conditioner when the output of said environment sensor remains unchanged after a predetermined time interval has elapsed.

2. An air conditioning system according to claim 1, wherein said environment sensor includes at least a door opening/closing sensor for detecting an open state of a vehicle door and a window opening/closing sensor for detecting an open state of a vehicle window.

3. An air conditioning system for use in an electric vehicle for air-conditioning the room of said vehicle by using the power of a battery used as a vehicle drive source, comprising:

a seated-state sensor associated with at least one seat of said vehicle for sensing whether a vehicle occupant is seated in said at least one seat; and controlling means for activating an air-conditioning switch so as to read the output of said seated-state sensor and for deactivating said air conditioning system when the output of said seated-state sensor represents that the vehicle room is in an unmanned state in excess of a first predetermined time interval.

4. An air conditioning system according to claim 3, further comprising a door opening/closing sensor for detecting na open state of a vehicle door, and a window opening/closing sensor for detecting an open state of a vehicle window, wherein prior to reading the output of said seated-state sensor, said controlling means activates said air-conditioning switch so as to read an output of said door opening/closing sensor and an output of said window opening/closing sensor and deactivates said air conditioning system when the output of said door opening/closing sensor and said window opening/closing sensor indicate that at least one of said vehicle door and said vehicle window have been opened in excess of a second predetermined time interval shorter than said first predetermined time interval.

5. An air conditioning system for use in an electric vehicle for air-conditioning the room of said vehicle, comprising:

an environment sensor for detecting the state of an environment in the vehicle room;

warning means; and controlling means for activating an air-conditioning switch so as to read the output of said environment sensor and for displaying information detected by said environment sensor on displaying means and activating said warning means when said environment sensor produces an output indicative of an improper state of environment in the vehicle room for a period of time in excess of a predetermined time interval.

6. An air conditioning system according to claim 5, wherein said environment sensor includes at least a door opening/closing sensor for detecting an open state of a vehicle door and a window opening/closing sensor for detecting an open state of a vehicle window.

7. An air conditioning system according to claim 6, wherein said environment sensor includes a seated-state sensor associated with at least one seat of said vehicle; and controlling means for activating an air-conditioning switch so as to read the output of said seated-state sensor and for deactivating said air conditioning system when the output of said seated-state sensor represents that the vehicle room is in an unmanned state in excess of a predetermined time interval.

* * * * *